Figure 1:
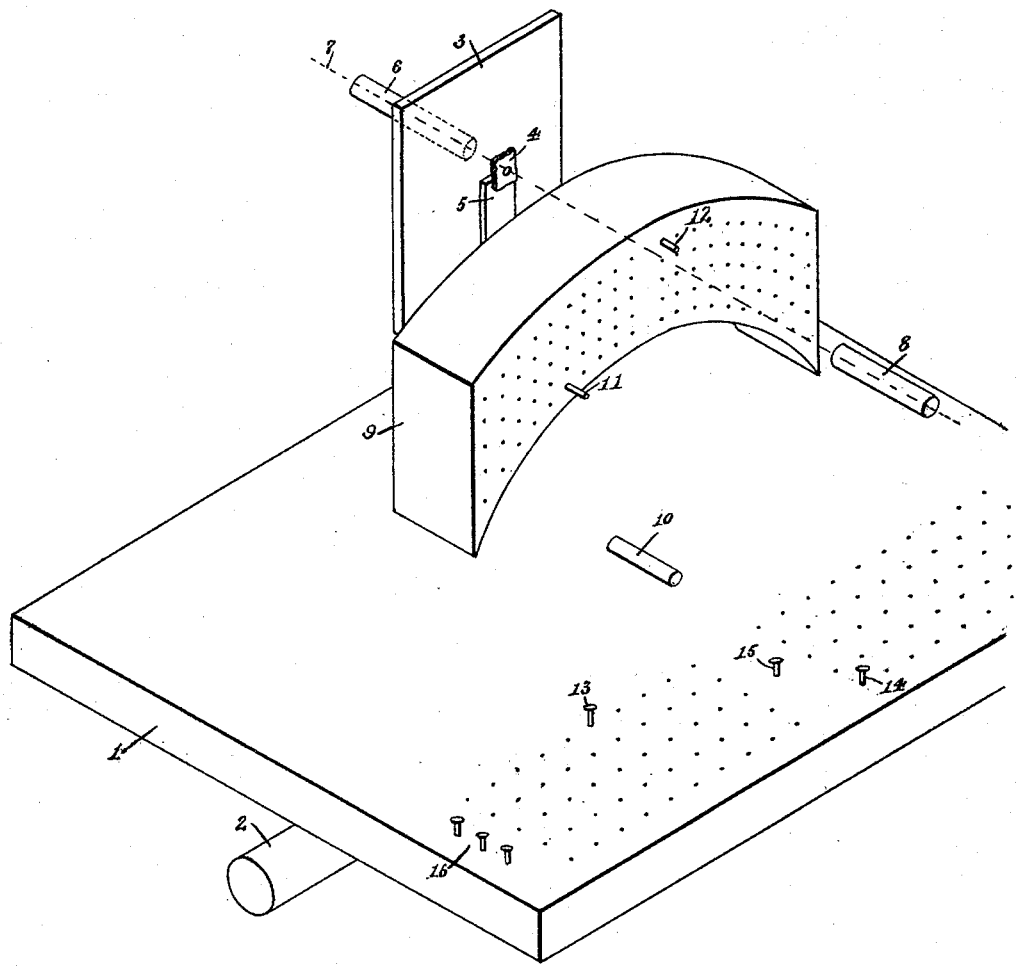

(No Model.) 12 Sheets—Sheet 1.

T. T. HEATH & A. N. VERDIN.
TYPOGRAPHIC MACHINE.

No. 483,252. Patented Sept. 27, 1892.

Witnesses:
M. S. Belden
P. P. Sheehan

Thomas T. Heath
Alvis N. Verdin
Inventors by James W. See
Attorney (No Model.) 12 Sheets—Sheet 2.

T. T. HEATH & A. N. VERDIN.
TYPOGRAPHIC MACHINE.

No. 483,252. Patented Sept. 27, 1892.

Witnesses:
M. S. Belden
P. P. Sheehan

Inventors
Thomas T. Heath
Alois N. Verdin
by James W. See
Attorney (No Model.) 12 Sheets—Sheet 3.
T. T. HEATH & A. N. VERDIN.
TYPOGRAPHIC MACHINE.
No. 483,252. Patented Sept. 27, 1892.
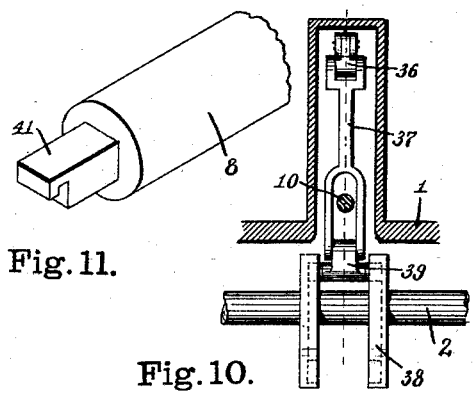
Fig. 11.
Fig. 10.
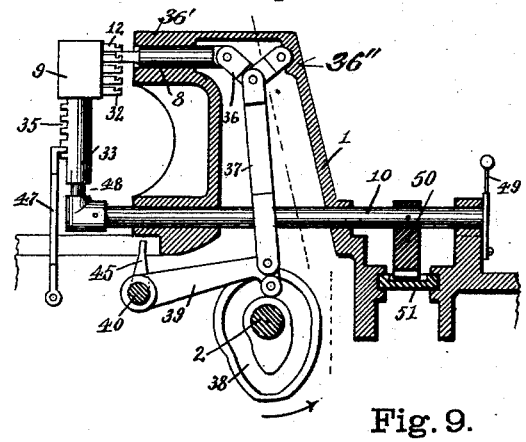
Fig. 9.
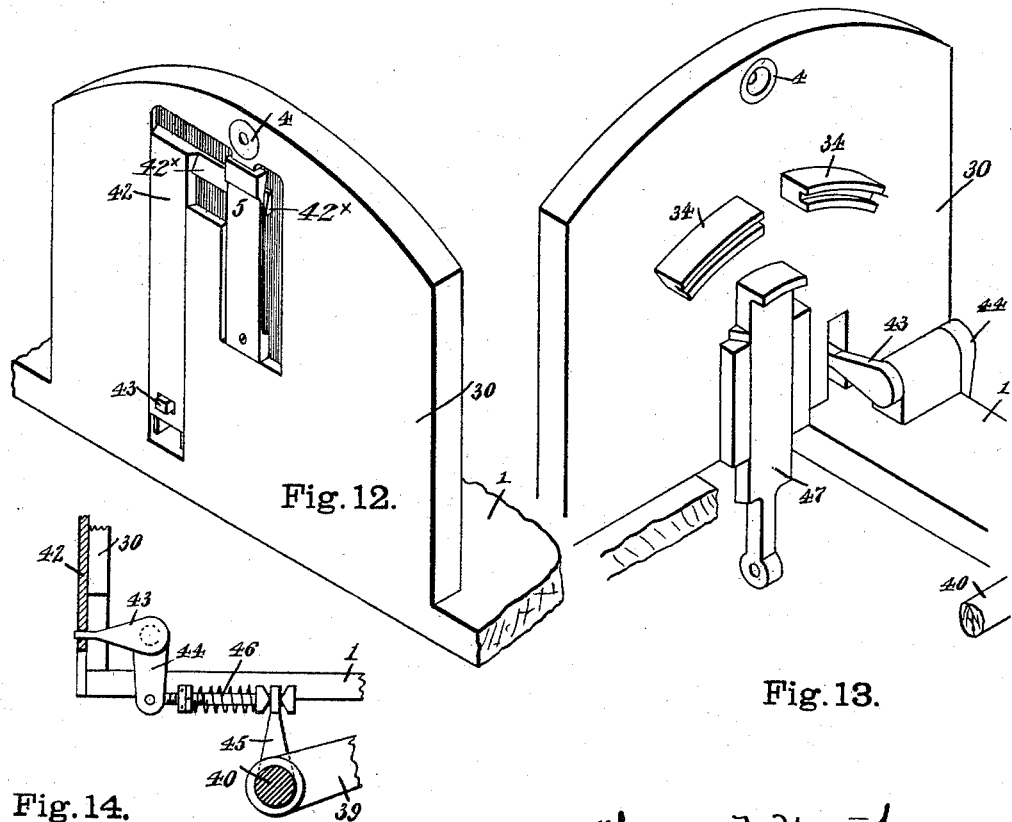
Fig. 12.
Fig. 13.
Fig. 14.
Witnesses:
M. S. Belden
P. P. Sheehan
Thomas T. Heath
Alvis N. Verdin
Inventors
by James W. See
Attorney

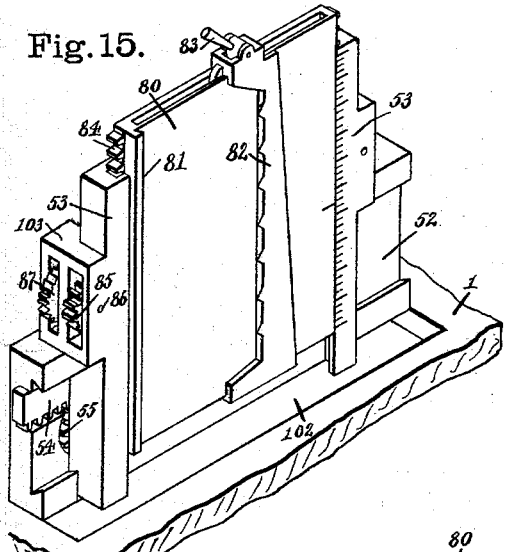

(No Model.) 12 Sheets—Sheet 5.
T. T. HEATH & A. N. VERDIN.
TYPOGRAPHIC MACHINE.
No. 483,252. Patented Sept. 27, 1892.
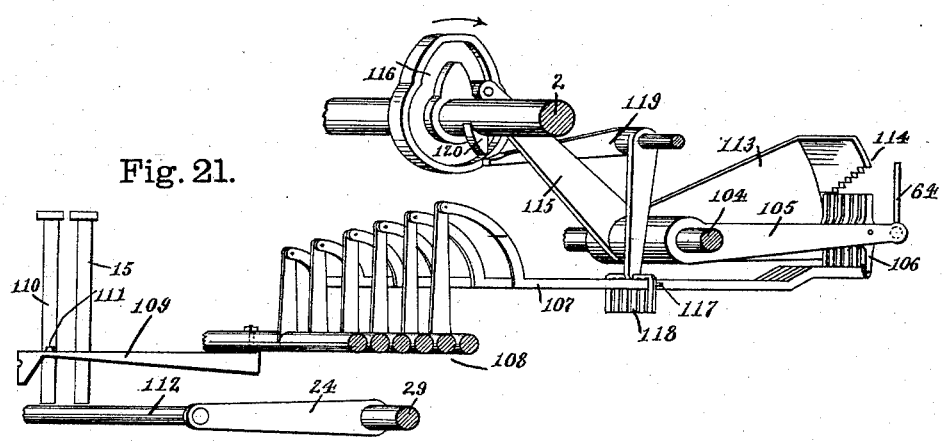
Fig. 21.
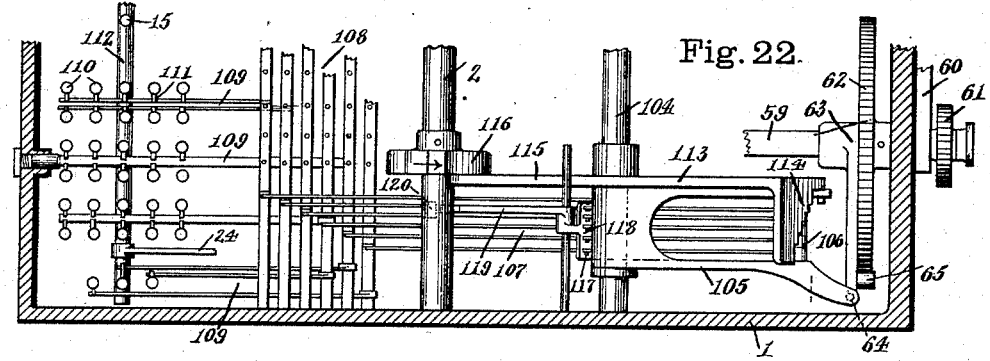
Fig. 22.
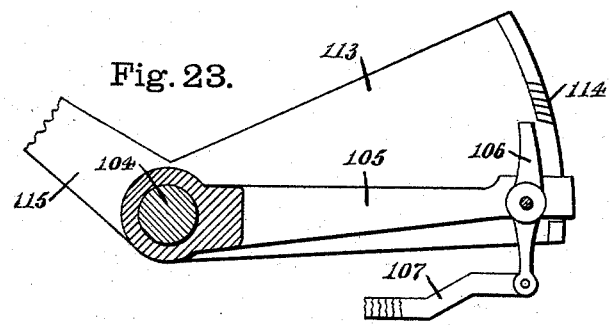
Fig. 23.
Fig. 24.
Witnesses:
M. S. Belden
P. P. Sheehan
Thomas T. Heath
Alvis N. Verdin Inventors
by James W. See
Attorney

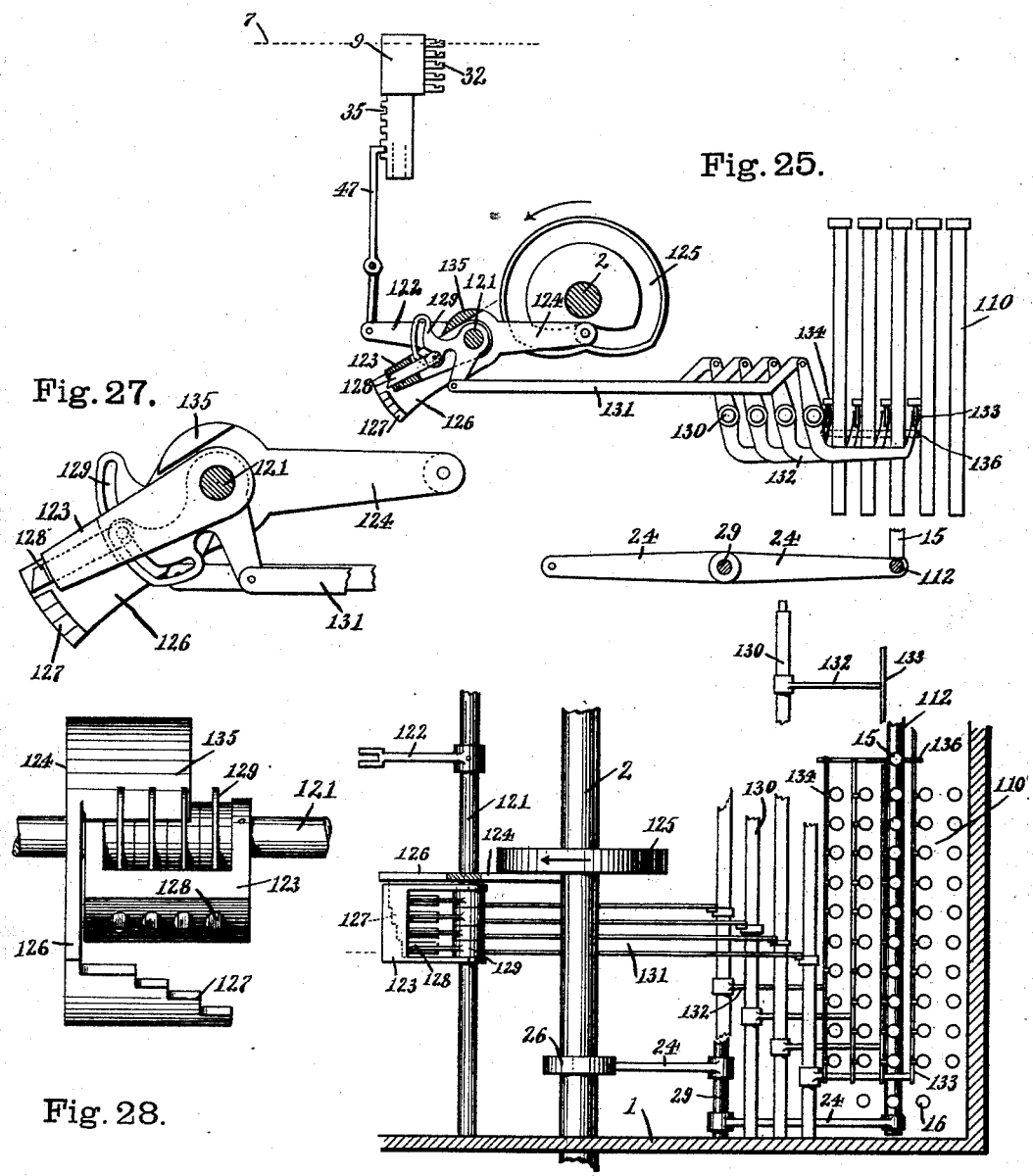

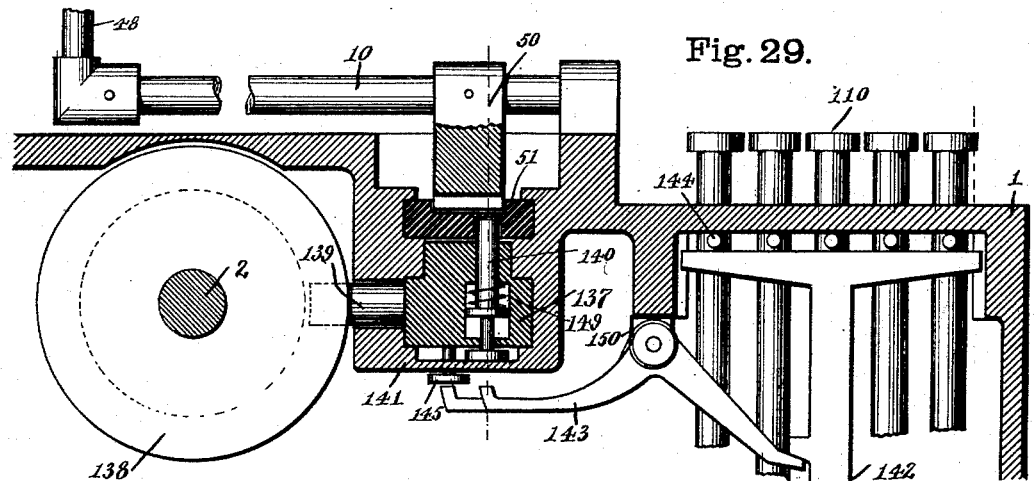

(No Model.) 12 Sheets—Sheet 8.
T. T. HEATH & A. N. VERDIN.
TYPOGRAPHIC MACHINE.
No. 483,252. Patented Sept. 27, 1892.
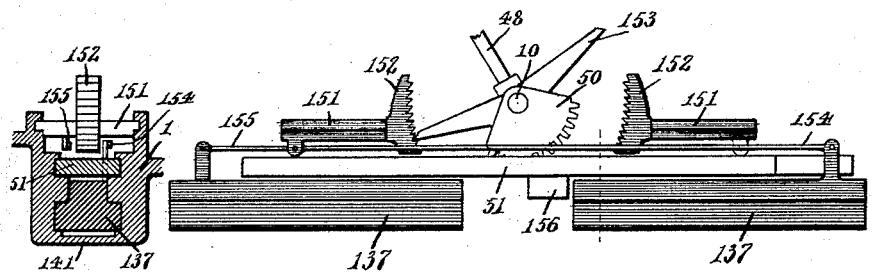
Fig. 33.
Fig. 35.
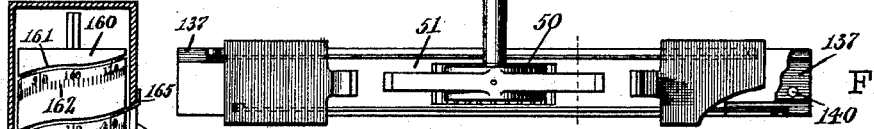
Fig. 34.
Fig. 39.
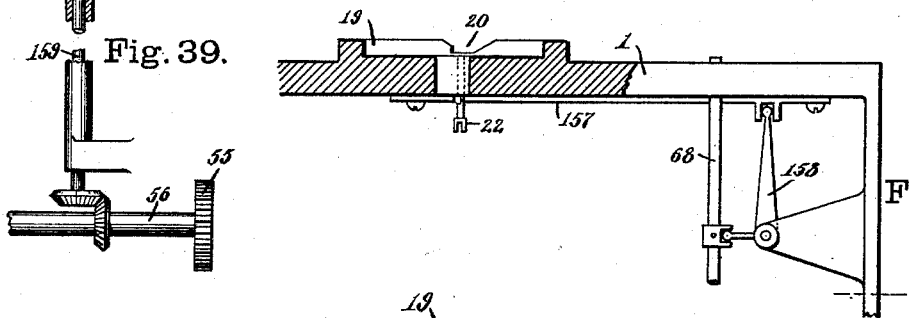
Fig. 36.
Fig. 37.
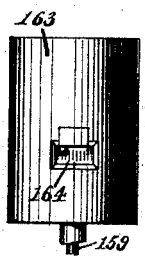
Fig. 38.
Witnesses:
M. S. Belden
P. P. Sheehan
Thomas T. Heath
Alvis N. Verdin  Inventors
by James W. See
Attorney

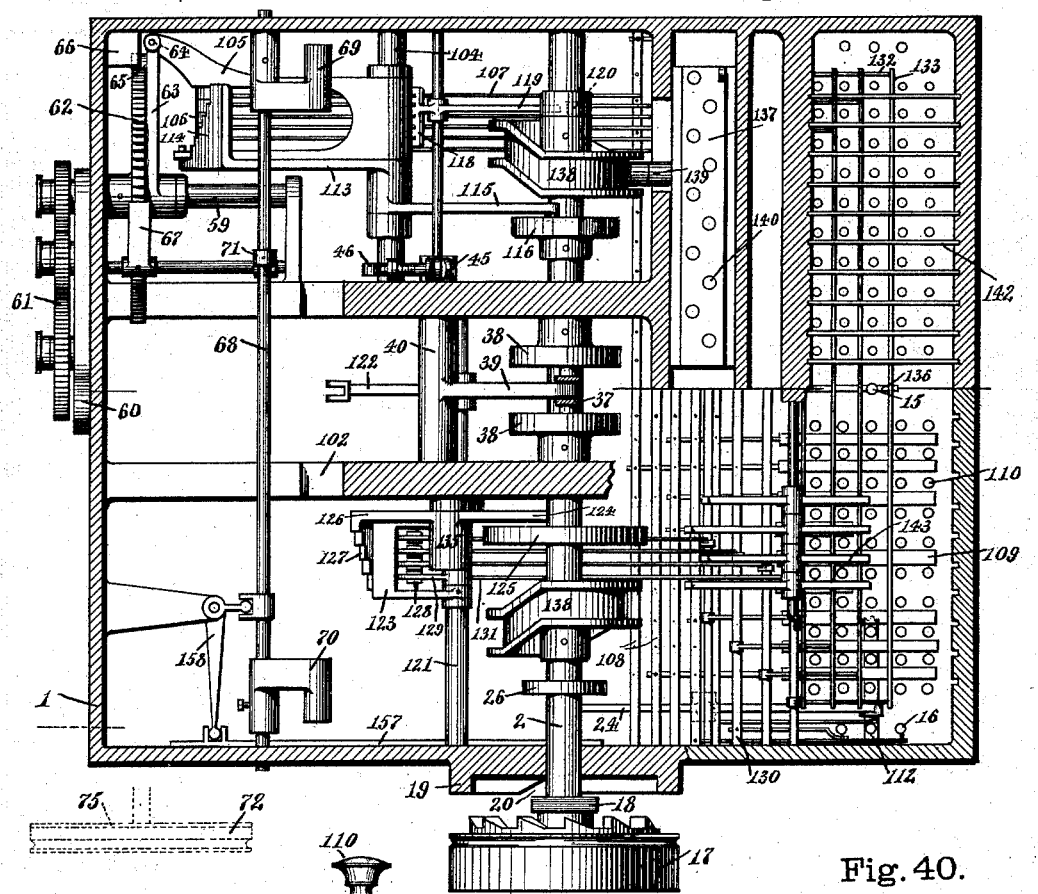
Fig. 40.
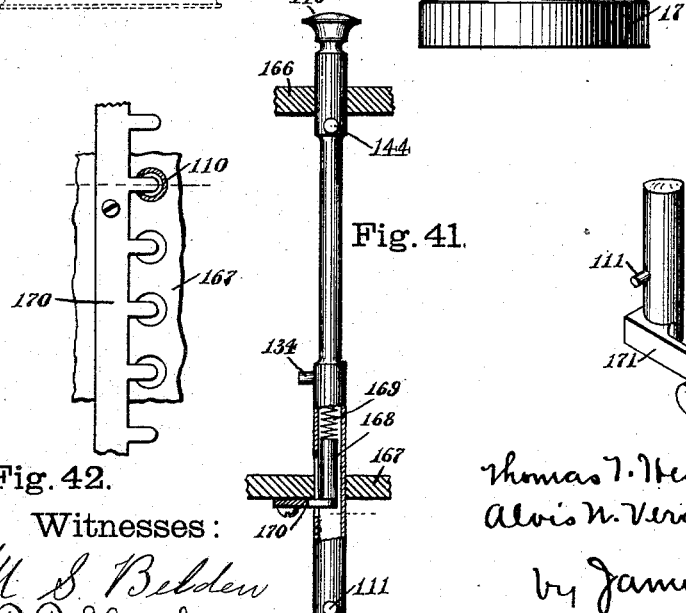
Fig. 41.
Fig. 42.
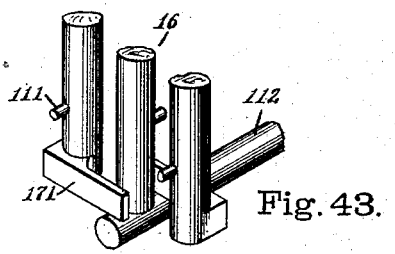
Fig. 43.

(No Model.) 12 Sheets—Sheet 10.

T. T. HEATH & A. N. VERDIN.
TYPOGRAPHIC MACHINE.

No. 483,252. Patented Sept. 27, 1892.

Witnesses:
M. S. Belden
P. P. Sheehan

Thomas T. Heath
Alvis N. Verdin
Inventors
by James W. See
Attorney (No Model.) 12 Sheets—Sheet 12.

T. T. HEATH & A. N. VERDIN.
TYPOGRAPHIC MACHINE.

No. 483,252. Patented Sept. 27, 1892.

Witnesses:
M. S. Belden
P. P. Sheehan

Thomas T. Heath
Alois N. Verdin
Inventors
by James W. See
Attorney

UNITED STATES PATENT OFFICE.

THOMAS T. HEATH, OF LOVELAND, AND ALOIS N. VERDIN, OF GLENDALE, OHIO; SAID VERDIN ASSIGNOR TO SAID HEATH.

TYPOGRAPHIC MACHINE.

SPECIFICATION forming part of Letters Patent No. 483,252, dated September 27, 1892.

Application filed July 6, 1891. Serial No. 398,601. (No model.)

*To all whom it may concern:*

Be it known that we, THOMAS T. HEATH, of Loveland, Clermont county, and ALOIS N. VERDIN, of Glendale, Hamilton county, Ohio, have invented certain new and useful Improvements in Typographic Machines, of which the following is a specification.

This invention pertains to a machine for impressing types one by one upon or into a surface to produce matter to be read or to produce a matrix from which printing-plates can be produced by electrotyping or stereotyping. The machine contains a case holding a type for each character to be produced, a finger-key for each type, a carriage to support the pad on or in which the impression is to be made, additional finger-keys for moving the pad when a "space" is to be produced, and a main driving-shaft. A given key being depressed causes the appropriate type to impress itself upon or into the pad and then causes the pad to advance in the direction of the line being printed a distance appropriate to the type which has just operated, thus putting the pad in proper position to receive the impression from the next type. The depression of a spacing-key produces an advance of the pad in the direction of the line without any type being impressed upon it. At the end of a line the pad automatically retreats for the beginning of the next line and rises to the level of the new line. All of the work of the machine is performed by the main driving-shaft, the finger-keys being virtually mechanical indicators, which determine the degree of given motions which shall result from transmissions from the driving-shaft. The case of type contains as many characters as may be desired; but preferably the case will contain a single font. Fonts may be instantly changed by lifting off the case of type and replacing it with another. The capacity of the machine for variety of work is therefore only limited by the number of font-cases on hand. Justification is fully and perfectly provided for, and, as it is a matter more of method than machine, it may be well to dispose of the subject before going into a consideration of the machine itself. Taking an ordinary font of English type, it will be found that a comma represents a minimum of width or space. Taking this width as a unit, it will, following ordinary proportions, be found that a number of other characters require the same width, that a lower-case "i" and a number of other characters take two of the units, that capital "W" takes seven of the units, and that all of the several characters of the font are represented by from one to seven of these units of width. For instance, a capital "H" having been impressed upon the pad, the pad must advance four units to be in position to receive the impression from the next type, capital "H" being four units in width. In our machine this unit is the minimum side feed of the pad, and the finger-key pertaining to a given type insures that type going into operative position, and after the type has been impressed insures a side feed to the pad corresponding with the number of feed-units pertinent to that type. There are seven space-keys, which when one of them is depressed will cause the pad to feed from one to seven of the unit-spaces without any type being impressed upon the pad. Assume two units as the normal spacing between words. Then we may cast up copy so many units for each several letter and two units for each space between words. Assume we are working on an ordinary newspaper column two and three-eighths inches wide, equal to, say, one hundred and twenty-eight units of feed for the font in hand. Copy may be cast up and line ends marked to bring the terminals of words or syllables within the one hundred and twenty-eight units, and shortages may be made up by adding a unit here and there to the spaces between words. A copy may be cast up and checked by pencil in advance, or the skilled operator may do the work in his head as he goes along.

Figure 2:
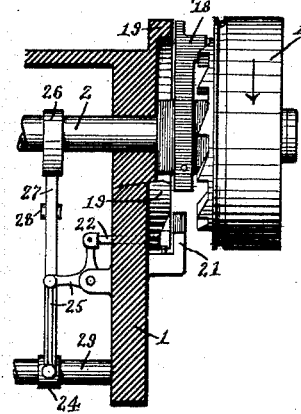
Figure 3:
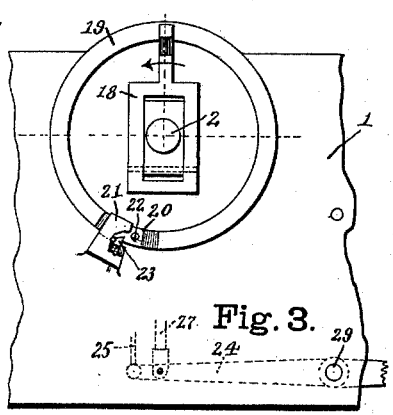
Figure 5:
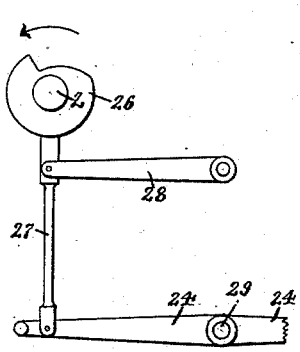
Figure 4:
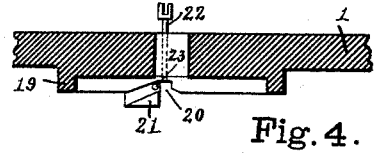
Figure 7:
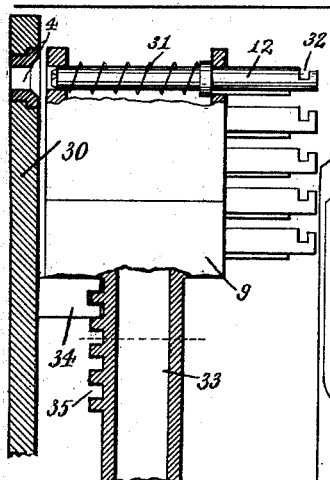
Figure 8:
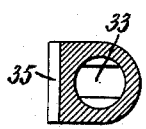
Figure 6:
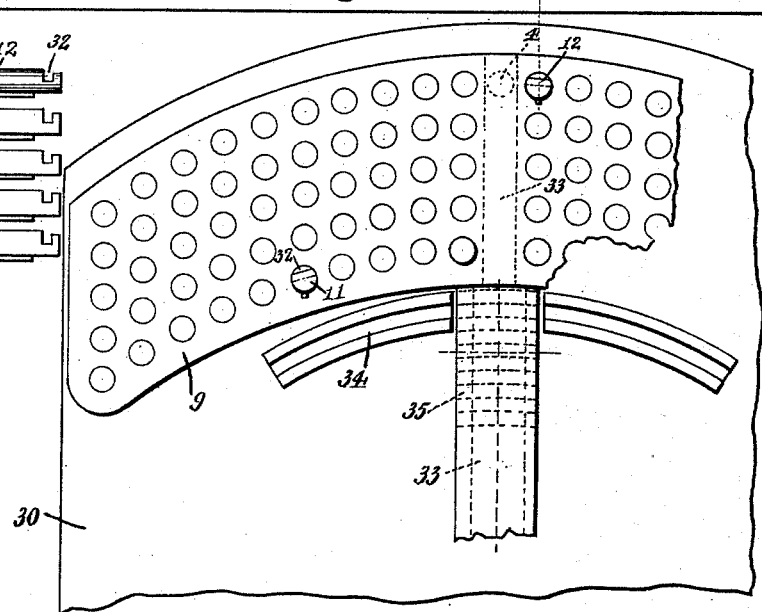
Figure 44:
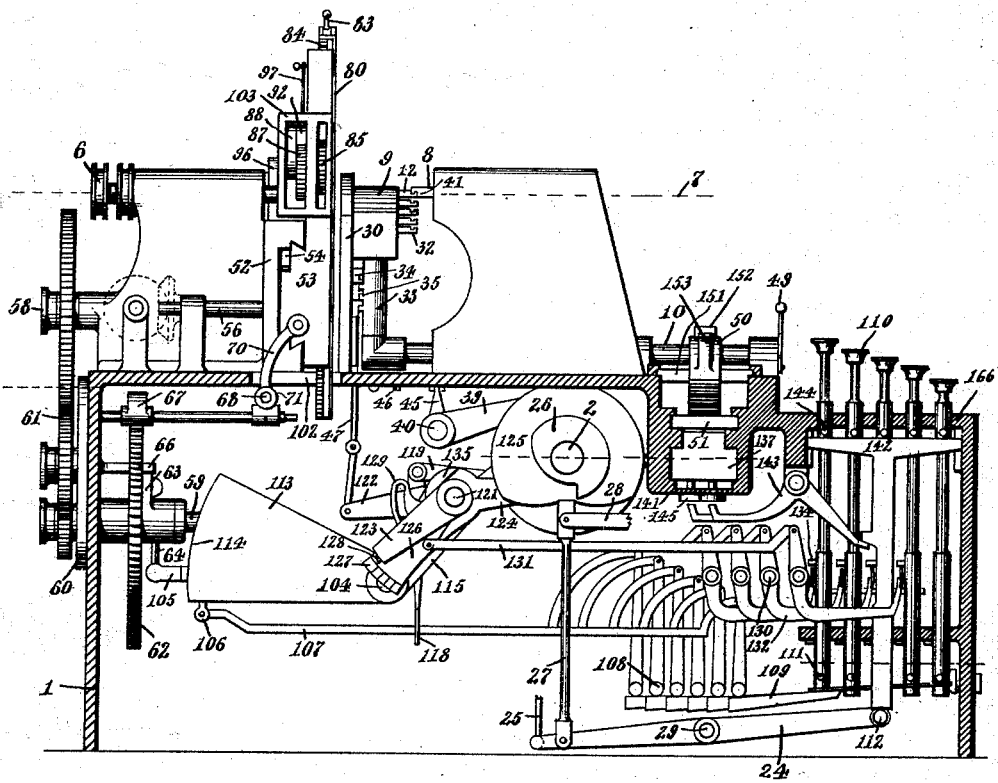
Figure 45:
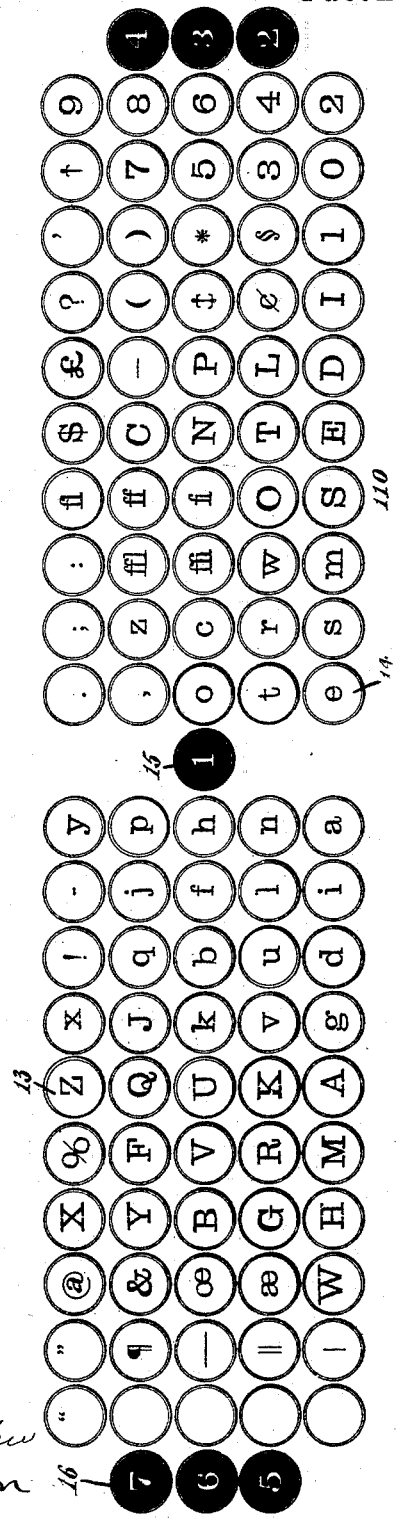
Figure 46:
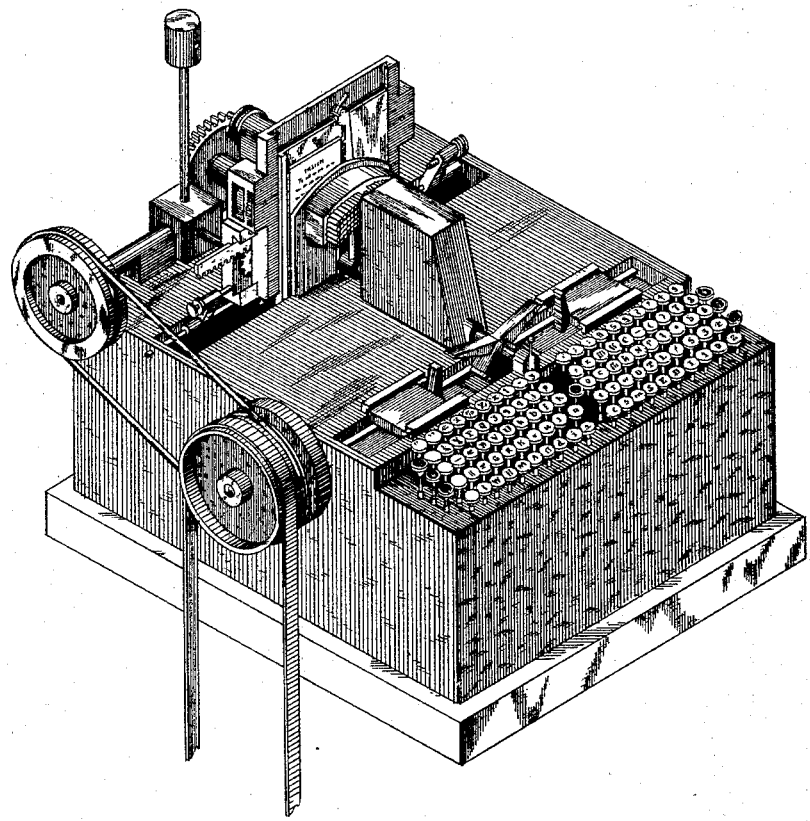

Figure 1 is a perspective view illustrating prime factors of the machine; Fig. 2, a rear elevation of stop-clutch mechanism; Fig. 3, a face view of stop-clutch mechanism minus the pulley; Fig. 4, a horizontal section of stop-clutch stationary rim; Fig. 5, a face view of stop-clutch cam; Fig. 6, a front elevation of type-case and face-plate; Fig. 7, a side elevation of type-case and vertical section of face-plate; Fig. 8, a horizontal section of type-case socket, bottom view; Fig. 9, a side elevation of plunger mechanism and type-case lifter; Fig. 10, a front elevation of plunger mechanism; Fig. 11, a perspective view of plunger end; Fig. 12, a rear perspective of face-plate and pressure-finger; Fig. 13, a front perspective of face-plate and finger-rocker; Fig. 14, a side elevation of pressure-finger rocker; Fig. 15, a front perspective of pad-carrying devices; Fig. 16, a rear perspective of pad-carrying devices; Fig. 17, a rear elevation of machine, illustrating pad-feed system; Fig. 18, a rear elevation of a pad-lifting ratchet mechanism; Fig. 19, a transverse section of rim of back-feeding pulley; Fig. 20, a section of an exemplifying feed-pawl; Fig. 21, a perspective view of feed-measuring devices; Fig. 22, a plan of the same; Fig. 23, a side elevation of feed-measuring curtain and dogs; Fig. 24, a rear elevation of same; Fig. 25, a side elevation of lift-measuring devices; Fig. 26, a plan of same; Fig. 27, a side elevation of lift-measuring curtain and dogs; Fig. 28, a rear elevation of same; Fig. 29, a side elevation, parts in section, of the swing-measuring devices; Fig. 30, a front elevation, parts in section, of the same; Fig. 31, a plan of the same; Fig. 32, a bottom view of swing-rack; Fig. 33, a front elevation of swing-locking mechanism; Fig. 34, a plan of the same; Fig. 35, a vertical transverse section of same; Fig. 36, a plan of pad-backing lock; Fig. 37, an elevation of same; Fig. 38, a front view of spacing-scale; Fig. 39, a side view, part section, of spacing-scale; Fig. 40, a plan of machine below table-top; Fig. 41, an elevation, part section, of a finger-key; Fig. 42, a bottom view of finger-key guide; Fig. 43, a perspective view at foot of spacing-keys 16; Fig. 44, a side elevation of machine with frame in vertical section; Fig. 45, a plan of exemplifying keyboard; Fig. 46, a perspective view of machine.

Segregable mechanisms are independently described and in cases independently illustrated, a drawing-figure to illustrate a given segregable mechanism often ignoring the existence of associate mechanism.

*Prime factors of the machine,*(Fig. 1.)—An understanding of the principles of construction of our machine will be more quickly arrived at from a thorough analysis of the prime factors involved in its work, and this analysis can be well made from Fig. 1 of the accompanying drawings, which is a perspective view illustrating, without any respect for proportion, the fundamental mechanical elements on which the machine is based. In this analysis this figure of the drawings is to be considered without reference to any other of the figures of the drawings. In this figure of the drawings, 1 indicates the bed or fixed part of the machine, whose only office is to give support to the moving parts; 2, the driving-shaft, which is to supply all the power and motion for the operations, subject to the indications of finger-keys, this shaft standing normally stationary, but going into motion and making one complete rotation at the touch of any finger-key; 3, the pad on or in which the impression is to be made by the type, this pad being of paper or wood or any suitable matrix-making or impression-receiving material, according to whether the machine is to be used for the production of an intaglio matrix or of a mere surface impression by inked type or transfer paper or ribbon; 4, an eye disposed in front of the pad in fixed position and through which the type will pass and be guided as it goes to the pad; 5, a pressure-finger near the face of the pad, close to the eye, and intended to press against the pad at the time of impression near the impression-spot to guard against possible buckling in the pad and against facial movement of the pad as the type withdraws from it, this finger being free from the pad at other times; 6, a fixed bar with its inner end against or near the rear surface of the pad or its holder, this bar forming the anvil which backs up the pad as it receives the impression; 7, the line of collimation passing through the anvil, the impression-spot upon the pad, the eye 4, through which each type has to make its impression, and through the plunger which is to press the given type to its work; 8, the plunger disposed in the line of collimation in front of the pad and arranged to move to and from the pad, its forward motion toward the pad serving to force to the pad any type which may have been brought into the line of collimation; 9, a type-case containing all of the type, the type being parallel with the line of collimation and arranged in several segmental rows, but two types appearing in the illustration, as the present analysis will deal with but two, the case of type being arranged to raise or lower and to swing sidewise in either direction, so as to bring any given type into the line of collimation and between the pad and the plunger; 10, a shaft at the axis of swinging motion of the type-case, each segmental row of type being on an arc struck from this axis with a radius equal to the distance from the axis to the line of collimation; 11, one of the types in the type-case, being the capital "Z," the inner farther end of this type having the character upon it and the outer end projecting so as to be attacked by the plunger when the plunger advances, it being understood that in this elemental drawing the parts have been normally separated in the direction of the line of collimation for the purposes of clearness of delineation; 12, another of the types in the type-case, this being the lower-case "e," it being noticed that while only two types are shown in the type-case mere dots represent the position of the balance of the types, and that type 12 is in the upper row just to the right of the center, while type 11 is in the lower row and much to the left; 13, a finger-key pertaining to type 11 (which is capital "Z") and occupying a position on the keyboard corresponding to the position occupied by its appropriate type in the type-case, except that lower row in type-case corresponds to upper row in keyboard; 14, a finger-key similarly pertaining to type 12, which is lower-case "e," this finger-key having an appropriate position on the keyboard—viz., lower row first to the right of the center; 15, a finger-key pertinent to no one of the types, but intended to produce a pad-travel equal to the minimum or unit of feed in the direction of the line being printed; 16, additional keys for other values of mere pad feed, representing, say, five, six, and seven, respectively, of the units of pad feed, it being understood that at the other end of the keyboard there are three more space-keys, representing, respectively, two, three, and four of the units of feed. Ignoring for the present the presence of type and plunger, we will assume that space-key 15 be depressed. It is then the duty of the driving-shaft to make one complete revolution and move the pad to the left a distance equal to the unit of space. If the key be depressed again, a second similar feed would be produced and twice the time would be consumed. Seven units of feed may be produced by seven actuations of this unit-key; but seven units of time, corresponding with seven impulses of the machine, will have been consumed. One of the space-keys 16 corresponds to seven units of feed, and if this key be depressed the driving-shaft will make one revolution and the pad will feed seven units of distance and at one impulse of the machine. Thus a touch upon a selected spacing-key may produce at one impulse of the machine and in a unit of time a pad-feed corresponding to any desired number of units within the maximum of seven. The spacing-keys are to be employed for spacing without impression of types. It should now be comprehended that the various types would require various multiples of the unit of pad-feed and that it is only necessary in arranging for the feed pertinent to each type to cause the mechanism which brings the type into action to act also upon the same feed mechanism which would have been acted upon had a space-key been pressed to produce the amount of feed proper for that type. In other words, when key 13, pertinent to capital "Z," is pressed it must have the same effect upon the feed mechanism as would have resulted if the space-key pertinent to four units had been pressed, capital "Z" requiring four units of feed. Briefly on this point, there are seven degrees of spacing available by spacing-keys acting on intermediate mechanism, and any type-key will act on the same intermediate mechanism and produce a feed appropriate to that type. It should now be understood that space-keys are to advance the pad without type-impression and that type-keys, regardless of what else they may do, are to advance the pad in degree as required by the several types.

While on the subject of feed it is to be understood that when the feed has exhausted a line, the pad must retreat to reach the beginning of a new line and rise to receive the new line. These movements are provided for automatically. It is the duty of pressure-finger 5 to stand normally free of the face of the pad; but as the type is being impressed and withdrawn press the face of the pad fairly to the anvil or to the pad-holding surface. It is the duty of plunger 8 to stand normally back; but when a given type has been brought into the line of collimation move forward and press that type through the eye 4 and impress it upon the pad and then retreat and permit the type to retreat. It may here be stated that we arrange the plunger to not only press the selected type to its work, but to draw it back to its normal position, instead of depending on a spring to effect the retreat of the type.

It is now a question of bringing a selected type into the line of collimation. It will be seen that the line of collimation cuts the center of the upper type-row; but there is no type at that point, what would be the central vertical row being entirely blank. This is the normal position of the type-case. If type 12, which is lower-case "e," is wanted for action, the type-case must swing to the left on shaft 10 as an axis until this type is in the line of collimation. There are ten vertical rows of type to the left of the center and ten to the right, and there are ten degrees of swinging motion in each direction for the type-case. Type 12 is in the first row to the right, and consequently calls for the first degree of swinging motion to the left. The upper row being struck from axis 10, the swinging motion can by itself bring any type of that row into the line of collimation. If a type in any but the upper row is wanted, then the type-case must be raised. Type 11, which is capital "Z," is in the lower row. There are five horizontal segmental rows and five degrees of lifting for the type-case. To bring type 11 into action would therefore require five degrees of lifting for the type-case and five degrees of swinging to the right. If key 13, pertaining to type 11, which is capital "Z," be depressed, it should cause the type-case to make five degrees of elevation and then to swing with five degrees of motion to the right. If key 14, pertaining to type 12, which is lower-case "e," be depressed, it should cause one degree leftward swinging of the type-case, but no elevation. The motion of the type-case is produced by the driving-shaft, and the type-keys determine the degree of lift and swing which will be given to the type-case. It may here be stated that we provide for automatically locking the type-case to position after the selected type has been brought into the line of collimation. It should now be understood that in the example chosen in Fig. 1 there are seven degrees of feed, five degrees of case-lift, ten degrees of case-swing, and two directions of case-swing. The touch upon a selected type-key must determine the number of degrees of these various motions which the particular type requires to bring it into the line of collimation. The driving-shaft gives an impulse to the machine at each complete rotation and it is normally stationary. A touch on a finger-key causes the shaft to make one rotation and perform the work which has been measured out by the key, and then returns the type-case to normal position. The operation may with propriety be described at this point. Key 13 being depressed, the driving-shaft starts into motion, the type-case lifts to the fifth degree, the type-case swings five degrees to the right, the case locks in this position, the pressure-finger presses the pad, the plunger pushes type 11 to the pad, the plunger and type retreat, the pressure-finger retreats, the plunger disengages from the type, the case-lock releases, the case swings to its normal central position, the case descends to its normal level, the pad moves to the left four units of distance, corresponding to capital "Z," the driving-shaft has exactly completed its single rotation and comes to rest, and all the parts are in normal position.

The foundation principles of the machine having thus been analyzed, its details can be more readily comprehended. The segregable mechanisms will be described, and generally in connection with drawing-figures showing the given mechanism alone.

*The stop-clutch*, (Figs. 2, 3, 4, and 5.)—It having been explained that the depression of any finger-key first results in the setting of devices to determine the degree of motion which is to take place in the mechanism and then starts the driving-shaft into rotation to produce that measured result, it is deemed proper at this point to explain the preferred form of stop-clutch which permits the driving-shaft to be thus put into motion and automatically and accurately stopped after it has made one complete rotation. Fig. 2 is a rear elevation of the stop-clutch mechanism, the machine-frame, and the upper portion of the stationary clutch-rim appearing in vertical section. Fig. 3 is a face view of the stop-clutch mechanism with the driving-pulley removed, so as to expose the stationary clutch-rim and the driving-dog; Fig. 4, a central horizontal section of the stationary clutch-rim; and Fig. 5, an end of the driving-shaft, showing the stop-clutch cam. In these figures, 1 is, as before, the stationary frame of the machine, and 2 the driving-shaft. 17 indicates the driving-pulley loose on the driving-shaft and provided upon its inner face with ratchet-teeth, this driving-pulley to be constantly driven by belt, so as to be at all times ready to be clutched to the shaft, the drawings showing this pulley as having a groove for an additional cord belt, with which we are not at present concerned; 18, a driving-dog fast upon so as to revolve with the driving-shaft and having a side tooth adapted to engage the ratchet-teeth of the driving-pulley, this dog, however, being pivoted upon the driving-shaft, so as to swing into and out of engagement with the teeth of the pulley; 19, a stationary facial rim concentric with the shaft and presenting its face to the rear of the dog, so that when the dog engages a pulley-tooth the rim holds the dog into engagement as the dog rotates, it therefore being obvious that if this rim were continuous the dog would constantly engage the pulley and there would be no means for disengaging the shaft from the pulley; 20, a notch in the face of this rim, back into which the dog may retreat when it comes to the notch, and thereby come out of engagement with the pulley-teeth, the most advanced wall of the notch being square, as seen in Fig. 4, so that when the dog goes into the notch it brings up square against this notch-wall and can go no farther; 21, a stationary incline disposed in front of the notch and forming an obstruction in the path of the rotating dog, the result being that the dog, rotating in engagement with a pulley-tooth, meets this obstructing-wedge and passes behind it, and becomes thereby withdrawn from the pulley-tooth and seated in the notch; 22, a push-pin presenting its outer end at the rear of the notch and adapted when pushed outwardly to push the dog out of the notch into engagement with a pulley-tooth and allow the dog to go on its course; 23, a spring-latch in the wedge to prevent rebound of the dog as it strikes the arresting square wall of the notch; 24, a lever mounted in the machine and forming the element which when lifted will push the push-pin out, this lever being hereinafter termed the "clutch-lever;" 25, connections, consisting of a bell-crank and link, for causing oscillations of the clutch-lever to reciprocate the push-pin; 26, a cam on the driving-shaft to serve in depressing the clutch-lever and withdrawing the push-pin in time to permit the dog to enter the notch when it reaches it, this cam being hereinafter termed the "clutch-cam;" 27, a connection from the clutch-cam to the clutch-lever, whereby after the shaft has started into rotation the clutch-lever will be pushed down and the push-pin withdrawn from the notch; 28, a guide-link for this connection, and 29 the axial shaft of the clutch-lever. The driving-pulley is always in rotation in the direction of its arrow, but normally the pin is back and the dog in the notch and out of engagement with the pulley-teeth. Therefore the shaft is stationary in the accurate normal position as determined by the square wall of the notch. In this position the low or vacant part of the clutch-cam is presented to the pin mechanism, so that the cam is without office. If now by any means whatever we lift the clutch-lever, the pin will be pushed out and the dog will engage a pulley-tooth and leave the notch, and thereupon the shaft rotates with the pulley, the cam immediately withdrawing the pin from the notch. As soon as the dog reaches the wedge it goes into the notch and disengages from the pulley, and the shaft suddenly stops in accurate normal position, and the latch 23 prevents the rebound of the dog from the forward notch-wall. The shaft will make another complete revolution if the clutch-lever be again lifted. Therefore if a finger-key of the machine, after doing certain other things to determine degrees of action to be produced by the driving-shaft, lifts the clutch-lever it will result in the driving-shaft making one complete revolution and then coming to rest, ready for the next installation of motion by the action of a finger-key. All of the finger-keys of the machine, no matter what else they may do, have the effect of lifting the clutch-lever. The low vacant place in the cam, standing normally opposite the connection 27, permits the clutch-lever to be lifted by the action of any finger-key, thus projecting the push-pin; but the shaft motion having been initiated by the action of the push-pin in causing the dog to engage a pulley-tooth the cam at once forces the clutch-lever down and withdraws the pin, and the dog is bound to stop against the notch-wall when it reaches it. There can therefore be no malperformance on the part of the shaft as a result of uncertain or long-continued pressure on the finger-key. The clutch-lever having been lifted by the depression of a key, the cam forces the pin to normal position, and a second positive impulse of the clutch-lever is required in order to give any further impulse to the driving-shaft.

*Construction of type-case and of lift-lock,* (Figs. 6, 7, 8, and 13.)—In the preliminary analysis in connection with Fig. 1 a general idea of the performance of the type-case was arrived at. It is now in order to look into the details of its construction and the means for maintaining it in position of lift after the lift has been made. The means for producing the lift and other motions will not now be considered. Fig. 6 is a front elevation of the type-case shown in connection with the stationary face-plate disposed to the rear of it and against the face of which it oscillates, the type-case being shown as in normal position—that is, central as regards swing and lowest as regards lift. Fig. 7 is a vertical central section of the stationary face-plate, the type-case also appearing in vertical transverse section at points, one point being at the location of type 12, which is lower-case "e," and the other point being at the center of its supporting-socket. Fig. 8 is a horizontal section of the socket viewed from the bottom. Fig. 13 is a front perspective view of the face-plate. 30 indicates a stationary face-plate standing between the type-case and the pad and supporting the eye 4, which was referred to in the preliminary analysis, the type-case oscillating against the face of the face-plate, whereby improper twisting of the type-case at its supporting shank and socket is prevented; 31, a spring upon each type, serving to hold the type back in normal position and preventing the type from accidentally moving forward and rubbing upon the face-plate or catching in the eye, a shoulder on the type limiting its back motion; 32, a clutch-notch upon the outer end of each type, adapted to be engaged by the plunger, as will be later explained, each type being feathered in its socket in the type-case, so as to guard against rotation of the type; 33, a socket formed vertically and centrally in the type-case in a hub projecting downward from it, this socket being adapted to be slipped upon an arm which supports and oscillates the type-case, as will in the future be explained when we come to consider the type-case-moving mechanism; 34, segmental ribs projecting from the face-plate toward the socket, the arc of these ribs being struck from the center of oscillation of the type-case—that is to say, shaft 10 previously referred to—these ribs being absent at the center of their common length and extending sidewise so far that when the type-case is at its extreme of swinging motion in either direction the socket-hub will not have passed beyond their outer ends, and 35 a series of teeth upon the back of the socket-hub, adapted to engage the segmental ribs, the position and number of the teeth being such as to properly engage the segmental ribs in any of the five positions of lift of the type-case. Assume the socket to set freely on a shank on which it may rise and fall, but fall no lower than the normal position—namely, with the top row of type tangent to the plane of the line of collimation in which is disposed the eye 4. The type-case, as before explained, has no central vertical row of type. If, without being lifted, the type-case be swung to the right or to the left, any selected type of the top row may be brought into line of collimation. Thus if we swing the case one degree to the left, type 12, which is lower-case "e," will be brought into the line of collimation and will be ready to receive the plunger. When the type-case is thus swung to the left for this letter, the upper tooth of the socket will have engaged the segmental ribs at the left, and the type-case is thus positively locked against improper lifting. After the selected type has been dealt with the type-case returns to its normal central position, and it is then at liberty to be lifted. Type 11 is capital "Z" and requires the fifth degree of lifting of the type-case and also five degrees' swing to the right. The type-case being lifted to the fifth degree brings the lower row of type to the level of eye 4 and permits any type in this row to be swung into position. When the type-case thus lifted is swung out of central position, other teeth of the socket engage the segmental ribs and prevent improper rising or falling of the type-case. It is therefore seen that when the type-case is in central position it is at liberty to be raised, so as to bring any desired circle of type to the level of eye 4 and the plunger, but that when the type-case has been swung out of central position it cannot have its vertical adjustment disturbed. It is sufficient now to add that the case-lifting mechanism simply raises and lowers the type-case on its shank to the proper degree while in central position.

Attention is directed to the disposition of the type in the type-case. All are upon arcs struck with a radius corresponding to the distance from the center of shaft 10, which is the center of oscillation of the type-case, to the center of the eye. The upper row will therefore normally coincide with the eye, and as any arc of type is lifted to the level of the eye that arc will coincide with the eye as the case is swung. The types are disposed in vertical rows and not in radial ones. Consequently the circumferential distance from type to type is the same in each arc, thus permitting a given degree of swinging motion to apply uniformly to the several arcs of type. The type-case may be as extended as desired. The exemplification shows a case of such segmental extent as to receive five arcs of type, having twenty types each, thus giving one hundred types, ample for usual practical conditions. A new font or additional sorts can be brought into use by simply lifting the type-case off of its shank and replacing it with another one properly provided with types. It will be observed that the bringing of any type into the line of collimation simply resolves itself into a combination of three selections—one selection from five degrees of lift, one selection from ten degrees of swing, and one selection from two directions of swing. It is the duty of the type-key pertinent to a given type to make these three selections. It will be understood, of course, that the characters on the faces of the types will be so disposed as to stand upright when brought to the line of collimation. Each type is feathered in its socket in the type-case and the character is properly disposed upon its inner end. Spring 31 is not depended upon as an agent to retract the type. The plunger retracts the type by reason of its engagement with the clutch-notch 32, as will in the future be explained.

*The plunger motion,* (Figs. 9, 10, and 11.)— Fig. 9 is a side elevation of the plunger mechanism, frame parts appearing in vertical section, the type-case being shown as lifted, so that the plunger will be swept by the type in the second row from the top. Fig. 10 is a front elevation of the plunger mechanism. Fig. 11 is a perspective view of the outer end of the plunger. The preliminary analysis in connection with Fig. 1 has shown us that the plunger stands normally back and that it makes its stroke only after the type-case has been adjusted to bring the given type into line with the plunger unless it makes an idle stroke for mere spacing. The normal level of the type-case is, as before explained, such that the plunger coincides with its top row of type, so that simple swinging motion will permit any type in that row to engage the plunger.

Referring to the present figures of the drawings, 36 indicates a toggle connected with the rear of the plunger, which reciprocates in fixed guide 36′ and engaging its heel in the fixed abutment 36″, formed in the fixed framework of the machine; 37, a toggle-bar connected with the toggle and reaching downward toward the driving-shaft 2 of the machine; 38, a cam upon the driving-shaft to give motion to the plunger, this cam being hereinafter termed the "plunger-cam," the cam being a facially-grooved cam and preferably made double, as indicated in Fig. 10; 39, a pivoted arm, whose free end engages the cam and the toggle-bar, the arm thus serving as a guide-arm for the lower end of the toggle-bar; 40, the pivot-shaft to which this arm is secured, this shaft being hereinafter termed the "pressure-finger" shaft, as its only office, regarded as a rotary element, is in connection with the movement of the pressure-finger, which is to be hereinafter described, and 41 a clutch-notch on the outer end of the plunger, adapted to engage the clutches on the types. The clutch-hooks of all the types present themselves normally in the same vertical plane, and the clutch-notch of the plunger when in its normal or back position is in this same vertical plane. Consequently when the type-case is down, which is its normal position, and the type-case is swung to the right or left all of the clutch-hooks of the top row of types may in turn make passing engagement with the clutch-notch of the plunger. Similarly the clutch-hooks of any of the arcs of type may sweep the clutch-notch of the plunger when the type-case is properly lifted. Having lifted the type-case to bring the desired row of types to the level of the plunger and having swung the type-case to bring the proper type of that row to the plunger, we find the plunger-notch engaging the clutch-hook of that type. All being ready for the stroke, the plunger now moves forward by the obvious action of cam 38 and the type is impressed, and then the plunger retreats, pulling the type back to normal position. The case then swings to central position and descends to normal position, leaving the plunger free from any type. It will thus be seen that a type after having been employed is positively restored to normal position, the spring upon the type not being necessary for this performance, the office of the spring being simply to prevent the accidental displacement of the type.

It has been before explained that the work of bringing the proper type into the line of collimation in obedience to the indication of a proper finger-key is performed by the driving-shaft 2 and during a single rotation of the driving-shaft. The driving-shaft during this single rotation must also produce the plunger movement. We therefore see at once that cam 38 must have an idle "dwell" while the shaft is adjusting the type-case and that it must then move the plunger to its work and back again. It will be observed from Fig. 9 that the plunger-cam is of such form as to perform its office in something less than the half-revolution of the driving-shaft, thus leaving somewhat more than a half-revolution in which the driving-shaft may perform its other offices.

*The pressure-finger movement,* (Figs. 1, 9, 12, and 14.)—Fig. 12 is a perspective view of the rear of the face-plate, showing the pressure-finger and its actuating-wedge. Fig. 13 is a perspective view of the front of the table, showing the rocker-arm for operating the wedge. Fig. 14 is a vertical section of the wedge and of the pressure-finger shaft heretofore referred to, showing the connections through which the finger-shaft operates the wedge. In the preliminary analysis it was explained that the pressure-finger normally stood near, but free from the pad near the eye, the finger pressing the pad just before and during the impression and during the withdrawal of the type from the pad. It will be clearly seen from Fig. 12 that the pressure-finger 5 is a flexible tongue mounted on the rear of the face-plate. 42 indicates a wedge-piece arranged for vertical sliding motion in the rear of the face-plate, the horizontal arm $42^\times$, forming the wedge portion of this wedge-piece, sliding vertically behind the free end of the pressure-finger 5 and being so arranged that a rising of the wedge results in the pushing outward of the pressure-finger; 43, a rocker-arm mounted on the machine-frame and engaging the wedge-piece, so that the rocker-arm may raise or lower the wedge-piece; 44, a rocker-arm united to the first rocker-arm; 45, an arm projecting upward from the pressure-finger shaft 40; 46, a spring connection from arm 45 to rocker-arm 44, whereby oscillations of finger-shaft 40 result in reciprocations of the wedge-piece, the spring upon the spring connection endowing the lifting motion of the wedge-piece with yielding variability. From Fig. 9 it will be obvious that the finger-shaft and arm 45 oscilitate in unison with the plunger motion, and it will be seen from Fig. 14 that forward motion of the plunger means upward motion of the wedge, this resulting in pressing motion of the pressure-finger. As the plunger retreats, the wedge is drawn down and the pressure-finger returns to normal non-pressing position. The spring connection relieves the upward movement of the wedge of positiveness, the spring yielding when the pressure-finger meets a certain resistance at the pad, the degree of finger-pressure being regulated by adjusting the tension of the spring.

*The case-lifting mechanism,* (Figs. 6, 7, 9, and 13.)—Consideration will not now be given to the mechanism for measuring the degree of lift, as that matter pertains to the functions of the finger-keys to be later explained.

Attention will now be given simply to the immediate lifting devices. The case is, as before explained, at liberty to rise and fall on its supporting-shank while in central position, the teeth 35 on the back of the case-socket then not being interfered with by the segmental ribs 34 on the face-place. 47 is a vertical slide mounted in guides on the front of the face-plate and having at its upper end a segmental tooth engaging the lowermost teeth of the case-socket, this slide being hereinafter termed the "case-lifter." This case-lifter is normally down, and so is the case. If a type in the top row of the case is wanted calling for no lift, then the case swings to the proper degree, the teeth of the socket then engaging the segmental ribs of the face-plate. The segmental form of the tooth of the case-lifter permits this swinging of the case without disturbing the vertical relationship between case and case-lifter. If the case makes an extreme swing to the right or left, its teeth may disengage entirely from the teeth of the case-lifter; but when the case returns to normal central position it again engages the lifter, the tooth of the lifter always engaging the lower teeth of the case. If the lifter be raised, the case will be brought to position to swing certain of its teeth in line with the segmental ribs of the face-plate and a certain one of its arcs of type into the line of collimation. The lifting motion of the case being thus understood, it is sufficient for the present to say that it is the duty of the main shaft to raise the case-lifter to such degree as may have been measured out to it by a finger-key and to restore the lifter to normal downward position after the impression has been made. Finger-keys pertinent to the top row of type of course measure out zero of lift.

*Case-swinging motion,* (Figs. 6, 7, 8, and 9.)— No consideration will at this time be given to the measurement of the degree of swing. 48 indicates the vertical shank, on which the case-socket is free to rise and fall under the action of the case-lifter, this shank projecting upwardly from the inner end of shaft 10, which shaft is mounted in bearings in the frame of the machine and is the shaft of oscillation of the type-case, the shaft being also free to slide endwise in its bearings; 49, a latch or button mounted on the outer bearing of the swing-shaft and engaging its end and serving to hold that shaft to its normal inward position, but capable of being turned out of the way of the shaft, so that the shaft can move endwise far enough to permit the case-teeth to disengage from the teeth of the case-lifter, thus permitting the type-case to be readily lifted from the shank when desired; 50, a toothed sector fast on the swing-shaft, and 51 a rack engaging this sector and mounted for reciprocation in the frame of the machine, this rack being hereinafter termed the "swing-rack." If the swing-rack be moved endwise in one direction, the case will swing in the opposite direction, and vice versa. The degree of movement of the rack and its direction of motion will determine which of the vertical rows of type shall be brought into the vertical plane of the line of collimation. The rack has a normal position corresponding to the central normal position of the type-case. After the type-case has been lifted to the proper degree, if lifting is called for by the given type, the rack moves to produce the proper degree of swing, and after the impression returns to normal position. It is sufficient at this time to say that it is the duty of the main shaft after it has lifted the type-case to move the swing-rack endwise in that direction and to that degree measured out to it by the finger-key of the given type and to return the rack to normal position after the impression has been made.

*Horizontal travel of the pad,* (Figs. 15, 16, 17, and 19.)—Each time a letter is impressed and also each time a space is wanted without impression the pad must move to the left a proper distance, and when the line is complete the pad must quickly move to the right and then rise for the start of a new line. Attention will not now be given to the mechanism for admeasuring the amount of the feed of the pad as it moves to the left, but will be confined for the present to the mechanism for transmitting the feeding motion, whatever its measured amount may be, and for feeding back the pad when the line is complete. Fig. 15 is a front perspective of the pad-holder, its carriage, and its supporting-rail, the stationary face-plate which belongs in front of the holder being omitted for purposes of clearness of view. Fig. 16 is a rear perspective of the main pad-carrying parts. Fig. 17 is a rear elevation of the machine, illustrating the general pad-feeding mechanism. Fig. 18 is a rear elevation of one of the pad-lifting ratchet devices. Fig. 19 is a radial section through the rim of the pulley, which produces the back-feeding of the pad-carriage. Fig. 20 is a side view of one of the feed-pawls, partly in section, illustrating an exemplifying spring provision.

Referring to the drawing-figures now under consideration, 52 indicates a feed-rail disposed upon the top of the frame and across the same parallel with the face-plate, the face-plate, however, not appearing in these figures, this feed-rail being bolted to the frame, so as to be adjustable to and from the face-plate to accommodate different thicknesses of pad material, this rail structure also supporting the anvil 6; 53, a feed-carriage arranged for horizontal sliding motion along the rail, the length of parts and capacity for sliding motion being suited for the maximum length of line to be dealt with by the machine; 54, a rack secured to this carriage and adapted to be engaged by two pinions, a feed-pinion for giving the step-by-step left-hand feed motion to the carriage, and a backing-pinion for moving the carriage to the right after a line of work is completed; 55, the backing-pinion; 56, the shaft of the backing-pinion, projecting rearwardly from the rail; 57, the feed-pinion; 58, the spindle of the feed-pinion, projecting rearwardly from the rail and fitted to receive a change-gear; 59, a feeding-spindle parallel with the feed-pinion spindle and mounted in the frame of the machine and having its rear end adapted to receive a change-gear; 60, a sector-bracket to support intermediate gears of the feed-train; 61, a train of change-gears connecting the feeding-spindle with the feed-pinion spindle and permitting alteration of the relative velocities of the spindles; 62, a ratchet-wheel fast on the feeding-spindle; 63, a pawl-arm oscillating on the feeding-spindle; 64, a link through which certain mechanism (not now to be described) rocks this pawl-arm; 65, a pawl carried by this pawl-arm and adapted to engage the feed-ratchet 62; 66, a fixed projection adapted to engage the heel of this feed-pawl when the pawl reaches the end of its back-stroke and disengage the pawl from the ratchet and hold it disengaged, which is the normal condition of the pawl; 67, a stop-pawl supported by the frame and normally engaging the teeth of the feed-ratchet and preventing retrograde motion of the ratchet; 68, a sliding stop-rod disposed across the machine-frame; 69, a stop upon this rod and adapted to be engaged by the right-hand edge of the feed-carriage when the carriage reaches its right-hand position corresponding with the left-hand end or beginning of the line of work, this stop having an adjusting-screw to limit the right-hand movement of the carriage, it being borne in mind that the terms "right hand" and "left hand" here used refer to a front view of the machine and pad, Fig. 17 being a rear view of the machine; 70, a similar stop upon the rod to be engaged by the other edge of the feed-carriage when the terminal of the line of work has been reached, this stop being adjustable to suit the length of line or width of column being dealt with; 71, a collar on the stop-rod, adapted when the rod slides to the left, as occurs at the end of a line of work, to engage the heel of stop-pawl 67 and disengage that pawl from the feed-ratchet, so as to leave the feed-ratchet at liberty to make retrograde motion; 72, a backing-pulley geared to the shaft 56 of the backing-pinion, this pulley being always in rotation by belt from driving-pulley 17, (see Fig. 2,) which is always in rotation, or from some other source of constant rotary motion, whereby this pulley is always tending to feed the carriage rapidly back to the right to the beginning of a new line of work, this pulley, however, being a slipping affair, as hereinafter explained, so that this back-feeding motion of the carriage will take place only when the resistance can be overcome by the pulley; 73, the web of this pulley, fast on its shaft; 74, the rim of the pulley, always in rotation from its belt; 75, a clamping-flange at one side of but not against the pulley-rim; 76, flat ring, preferably of leather, clamped to the web of the pulley by the rim and clamp-flange; 77, spring-bolts holding the clamp-flange to the pulley-rim and bringing the rings 76 to bear with adjustable elastic pressure upon the sides of the web of the pulley; 78, the pivot of the feed-pawl 65; and 79, a spiral spring disposed around this pivot within a counterbore in the pawl and engaging the pivot and pawl, so as to tend to press the pawl into engagement with its ratchet, this construction applying also as a recommended form to the stop-pawl 67. Pawl-arm 63 is normally up and its pawl out of engagement with the feed-ratchet. If the arm be pulled down, the pawl will engage the ratchet and turn the ratchet an amount corresponding to the downward movement of the arm. The minimum amount of downward movement of the arm represents the unit of feed motion of the machine. To produce two units of feed, the arm must move down twice as far, and to produce seven units of feed it must move down seven times as far. It is the duty of the driving-shaft at each rotation to depress this pawl-arm to such a degree as may be indicated by the touched finger-key, and then to return the pawl-arm to its normal upward position with its pawl disengaged. It will be obvious that a forward motion of the ratchet-wheel will result through the gear-train and feed-pinion in a feeding motion of the carriage to the "left." The unit of pawl motion is constant in the machine, but the unit of pad travel will of course require to vary with the font of type. The change-gears permit of proper proportioning between the unit of feed initiation and the unit of feed result. The backing-pulley, being always in rotation, tends constantly to urge the carriage backward to the beginning of a new line; but the pulley-rim drives by friction only. The stop-pawl 67 prevents the backing-pulley from accomplishing any result, and the feeding motion produced by pawl 65 is performed against the opposing tendency of the backing-pulley. When the carriage reaches the end of the line of work, it engages stop 70 and moves the stop-rod endwise, and collar 71 releases the stop-pawl from the feed-ratchet, and, the feed-pawl 65 being normally disengaged, the feed-carriage is no longer restrained, and therefore the backing-pulley is at liberty to make its influence felt and to quickly move the carriage back to the right, (the left of Fig. 17.) As the carriage reaches its extreme right-hand position it engages stop 69 and restores the stop-rod and stop-pawl, and thereupon the backing-pulley goes on with its slipping and the carriage is at rest in a position corresponding with the beginning of a line. Under ordinary circumstances the carriage-feed pertaining to the last letter of a line would be an onward feed pertinent to that letter; but the backing motion takes its place. The anvil 6 bears against the back of the pad and meets the strain of the impression, the loose sliding joints of the carriage having therefore no effect on the accuracy and uniformity of the depth of impression.

*Pad-backing lock,* (Figs. 36 and 37.)—It being understood that the backing-pulley is constantly tending to urge the pad back to the beginning of a line and that this tendency holds good whether the driving-shaft be in motion or not, it might be suspected that when the last letter of a line had been struck and the pad had started on its retreat a certain interval of time would be required for the retreating motion, and during this interval a quick operator might press upon the next key, thereby causing an impulse to the machine before the pad got back to proper starting-point. A high rate of rotation for the backing-pulley removes the possibility of such a happening and with ordinary lengths of line and at ordinary speeds of machine the occurrence would be a very unlikely one, even with moderate speed to the backing-pulley; but out of abundant caution we provide for the push-pin being locked back while the pad is retreating, thus preventing the possibility of a finger-key being depressed while the pad is on its back travel. Fig. 36 is a plan and Fig. 37 a side elevation viewed from the inside of the machine of the mechanism for effecting this locking. Referring for a moment to Fig. 17, it will be understood that the backing motion of the pad is installed by the endwise motion to the right of stop-rod 68, the rod being moved by the carriage coming in contact with its right-hand stop. (Right hand in Fig. 17.) The push-pin 22, as seen in Fig. 36, is provided with a notch in its side, and a slide-bar 157 when pulled back engages this notch and renders it impossible that the pin shall go out and start the machine. 158 is a bell-crank lever pivoted in the frame and connected with the stop-rod and with this slide-bar, so that when the stop-rod is moved to permit the pad to retreat the slide-bar at the same time engages the notch of the push-pin and locks the push-pin. While the push-pin is thus locked, it would be impossible to depress a finger-key or start the machine; but when the pad-carriage has completed its retreat it restores the stop-rod and at the same time unlocks the push-pin.

*Vertical motion of pad,* (Figs. 15, 16, 17, and 18.)—When a line of work has been completed and the carriage has made its rapid retreat to the starting-point or during that retreat, the pad must rise to a proper level to receive the new line of work. The backing motion of the carriage is caused to produce this effect.

Referring to the drawing-figures now under consideration, 80 indicates the pad-holder, a plate arranged for vertical sliding motion in the carriage; 81, a dovetailed rib upon the left-hand edge of the pad-holder to grip that edge of the pad; 82, a pad-clamp to grip the right-hand edge of the pad and arranged to slide upon the pad-holder to and from the dovetailed rib, this clamp being provided with inwardly-projecting spurs to catch in the edge of the pad; 83, a finger-cam attached to the pad-clamp and engaging the top of the pad-holder and serving to lock the pad-clamp in adjusted position upon the pad-holder; 84, a rack upon each edge of the pad-holder; 85, pinions mounted in the carriage and engaging these racks, these pinions being hereinafter termed the "lift-pinions;" 86, the spindles of these pinions; 87, ratchet-wheels fast on these spindles, the lift-pinions and their accessories being in duplicate, one at each side of the pad-holder, simply for the purpose of giving a free, smooth, and true motion to the pad-holder, the lift-ratchets, &c., being hereinafter described in the singular, as both are alike; 88, a pawl-carrier rocking on the spindle of the lift pinion and ratchet; 89, a three-armed lever mounted for free oscillation on the back of the carriage and preferably provided with a spring, the same as 79, as in Fig. 20; 90, a rearward projection, preferably a roller, from the central one of the arms of this lever; 91, links connecting the other arms of the lever to the pawl-carriers, whereby oscillation of the lever results in simultaneous movement of the two pawl-carriers in opposite directions, both pawl-carriers moving outwardly at the same time; 92, pawls—we will call them "lift-pawls"—mounted in the pawl-carriers and engaging the lift-ratchets; 93, spring-plungers abutting in the pawl-carriers and serving to press the lift-pawls into engagement with their ratchets; 94, lift stop-pawls pivoted upon the carriage and engaging the lift-ratchets and preventing retrograde motions of those ratchets and the descent of the pad-holder, these pawls being by preference of the same construction as is shown in Fig. 20 so far as their spring provision is concerned; 95, projections on the lift stop-pawls and on the links 91, adapted to engage when the links are moved far inwardly, whereby such extreme inward motion of the links lifts the pawls out of engagement with their ratchets; 96, a wiper pivoted to the rail and presenting an incline to roller 90 in such direction that the roller meets this incline when the carriage makes its backing motion, the wiper being held to normal position by the gravity of its lower end, the wiper yielding to permit the idle passing of the roller in the direction of forward feed; 97, a finger-lever pivoted upon the carriage at the point of pivoting of the three-armed lever; 98, a pin projecting rearwardly from the finger-lever and adapted to intercept the upper arm of the three-armed lever and limit the backward or idle stroke of the lever; 99, a series of detent-holes in the back of the carriage to serve in fixing the position of the finger-lever; 100, an additional hole of this series, but having an extreme and isolated position; 101, a horizontal slot through the carriage to permit the anvil 6 to take direct bearing against the pad-holder; 102, a slot in the top of the machine-frame to permit of the traverse of the pad-holder when it is well down, and 103 a roof over each of the lift-ratchets supported by the carriage in position to be engaged by the heels of the lift-pawls when the heels of the lift-pawls are drawn well inwardly, so as to disengage the lift-pawls from the ratchets. The pad-gripping arrangement illustrated is designed with special reference to holding pad material of such thickness and strength as to permit edgewise grasping. If extremely flexible material be employed for the pad, then of course the pad-gripping devices will be modified accordingly. With the present device the pad is placed against the pad-holder and pressed edgewise to the dovetailed rib, and then the pad-clamp is pressed to its free edge and secured. Referring to Fig. 17 and assuming that the carriage is making its quick backing trip toward stop 69, it will be observed that roller 90 has ridden upon the wiper and will soon pass the wiper. This has rocked the three-armed lever and has advanced the lift-ratchets and lifted the pad-holder, and the lift stop-pawls maintain the position of the ratchets. When the roller leaves the wiper after riding up it, the roller drops until the upper arm is arrested by pin 98. This is the normal position of the three-armed lever and represents the end of the back-stroke of the lift-pawls. The wiper always lifts the roller to full height, but starts to lift it from a normal position determined by pin 98. Therefore the degree of lift-pawl motion can be modified by moving pin 98, and this can be done by shifting the finger-lever to a selected one of the series of detent-holes 99. There can therefore be as many adjustments for lifting motion of the pad-holder as there are holes in the series. At each backing trip of the carriage the pad-holder will be lifted the adjusted degree and the degree will be adjusted to suit the line-spacing of the work in hand. By turning the finger-lever to detent-hole 100 the three-armed lever will be locked to an extreme position and the links and pawls will be drawn far inwardly. This results in the disengagement of the lift-pawls and the lift stop-pawls from the ratchets and leaves the pad-holder free for vertical motion and permits it to be raised or lowered by hand to any desired point or to be removed from the carriage. When replaced and set where wanted, the finger-lever is again set to the proper detent-hole, thus causing the stop-pawls to support the pad-holder and putting the parts in condition for regular operation.

*Pad-position scales,* (Figs. 15, 17, 38, and 39.)—It will often be found convenient and even necessary to be able to bring any given point of the pad to the line of collimation by hand. For this purpose we provide index-scales, one for the vertical setting of the pad and one for the horizontal setting. In Fig. 15 it will be observed that at the right of the carriage there is a series of graduations indexed by a mark on the pad-holder. This is merely an exemplifying adaptation of vertical scale and its use is obvious. It will serve to show the present relative position of the pad-holder or will serve in setting the pad-holder by hand to any desired vertical position. The graduations may be numbered as desired, but, preferably, with reference to the minimum vertical spacing or line-pitch for which the machine is arranged, greater line-pitches being, preferably, multiples of the minimum line-pitch. The horizontal position may, of course, be indicated by a simple horizontal scale similar to that employed for the vertical indications; but we have provided a cylindrical scale to be read through a wicket in a cylindrical case, Fig. 17, showing the rear of this scale mechanism, while Fig. 38 is a front view of the scale and Fig. 39 a side elevation, the cylindrical case being in vertical section. Pinion 55 is permanently geared to the carriage-rack and therefore its position of rotation is indicative of the position of traverse of the carriage. 56 is the spindle of this pinion, through which the backing-pulley transmits its effect. The cylindrical scale for indicating the horizontal position of the carriage and pad is geared to this spindle, though it will be obvious that it may be geared to the feeding-spindle 58 or with any other moving part, whereby carriage-travel becomes converted in the rotation of the scale-cylinder.

Referring now to the exemplifying construction, 159 indicates a vertical spindle supported in a bearing carried by the rail, this spindle being geared in the exemplification to the spindle of the backing-pinion which engages the carriage-rack; 160, a cylinder mounted upon the upper end of this spindle at a height convenient to the eye of the operator, this cylinder rotating with the spindle, but capable of vertical motion—as, for instance, by being splined to the spindle; 161, a coarse spiral groove or thread upon the periphery of the cylinder; 162, a spiral series of graduations upon the cylinder, this series of graduations being parallel with the spiral thread of the cylinder; 163, a cylindrical case carried at the upper end of the spindle-bearing and completely inclosing the graduated cylinder, but giving the cylinder room for the proper vertical motion; 164, a wicket in the front of this cylindrical case, through which a small portion of the series of graduations of the cylinder may always be seen, and 165 a tooth projecting inwardly from the case into engagement with the spiral groove of the cylinder. As the carriage moves on the rail the spindle 159 rotates and the graduated cylinder rotates. During the rotation the graduations move in procession past the wicket. If the gearing and size of parts was such as to permit a single rotation of the cylinder to represent the maximum travel of the carriage, then a simple circumferential line of graduations and a simple rotation of the cylinder would answer every purpose; but an attempt to indicate the entire carriage-travel by a single circumferential line of graduations on the cylinder will result either in a very large cylinder or in very closely-grouped graduations, both of which are objectionable. We therefore arrange for employing several turns of the cylinder to indicate the complete carriage-travel. The line of graduation is arranged spirally upon the cylinder, and therefore the length of the line is limited only by the length of the cylinder. The tooth 165, engaging the thread of the cylinder, causes the cylinder to screw up and down in the case as it rotates, thereby carrying the graduations in spiral procession past the wicket. The graduations may be numbered as deemed most expedient; but their value-numbers will preferably have reference to the minimum spacing for which the machine is arranged. By means of these scales it will be possible to tell at a glance the present position of the carriage with reference to the line of collimation, and it will also be possible to bring any desired part of the pad to the line of collimation by properly moving the carriage and pad-holder by hand. The pad may be brought to any desired horizontal position quickly by using the greatest space-key, the pad therefore advancing the maximum number of spaces at each impulse of the machine. If, however, the desired position calls for a retreat of the pad instead of an advance, then the greatest spacing-key may be employed in quickly advancing the pad to the end of the line, whereupon the pad automatically retreats to the beginning of the line, after which a spacing-key may be employed in advancing the pad to the desired point, or instead of employing a spacing-key to advance the pad to the end of a line to produce the automatic retreat the stop-rod may be moved endwise by hand, thus causing the retreat to take place at once.

*Admeasurement of pad feed,* (Figs. 21, 22, 23, and 24.)—Refer for a moment to Fig. 17 and bear in mind that the number of units of pad feed is determined by the number of units of descent of pawl-arm 63 at each impulse of the machine. Refer for a moment, also, to Figs. 2 and 5 and bear in mind that an outward movement of push-pin 22 means a single rotation of the driving-shaft and that the rocking of clutch-lever 24 means outward motion of the clutch-pin, a rocking of the clutch-lever by any means whatever therefore resulting in a single rotation of the driving-shaft. It may here be stated that all of the finger-keys, no matter what else they may do, have the effect of rocking the clutch-lever and causing the machine to make one impulse, and it may be further stated that no impulse of the machine will ever be wanted without at least one unit of feed for the reason that each impulse is to produce either a type-impression calling for one or more units of feed or else a spacing equal at least to the unit of feed. An impulse of the machine producing in all cases one unit of feed, the question of admeasurement of feed then resolves itself into a matter of additional units.

Referring to the drawing-figures now under consideration, Fig. 21 is a perspective view, or "oblique elevation" it might be called, of the feed-measuring devices; Fig. 22, a plan of the same; Fig. 23, an enlarged side elevation of the feed-cam lever and feed-dogs, and Fig. 24 a rear elevation of these latter parts. The clutch-lever 24 and clutch-lever shaft 29 will be identified by reference to Fig. 3, and the feeding-spindle 59 and its pawl-and-ratchet mechanism will be identified by reference to Fig. 17. 104 indicates a pivot-shaft mounted in the frame parallel with the driving-shaft 2; 105, a rearwardly-reaching arm pivoted on this shaft and having the link 64, which operates the pawl-arm 63, connected with its rear end, this arm 105 being hereinafter termed the "feed-dog" arm; 106, a series of six dogs pivoted in the outer end of the feed-dog arm and presenting their upper ends in a rank parallel with the axis of the feed-dog arm; 107, links reaching forward from the lower ends of the feed-dogs 106, one link for each dog; 108, a series of tumbling-shafts disposed across the machine to the rear of the finger-keys, there being six of these shafts, each one having an arm connected to one of the dog-links, whereby the rocking of one of these shafts will result in the rearward movement of the upper end of the appropriate one of the dogs, these shafts being hereinafter termed the "feed-dog" shafts; 109, levers secured to these shafts and extending forward between the stems of the finger-keys, the levers being so distributed as to bring the desired feed-dog shafts under the influence of appropriate finger-keys, the distribution shown in Fig. 22 being merely exemplifying; 110, exemplifying finger-keys; 111, pins projecting from the stems of some of the finger-keys over the levers 109; 112, a rod extending across the machine and mounted in clutch-lever 24, so that the clutch-lever may be rocked and the machine started by action at any point in the length of the keyboard; 113, an arm mounted on shaft 104 and extending rearwardly alongside the feed-dog arm 105 and provided at its rear end with a curtain just to the rear of the feed-dogs; 114, steps, six in number, in the lower edge of this curtain, the lowermost step being a trifle above the level of the upper ends of the feed-dogs and each succeeding step being higher than its predecessor, the steps being uniform and there being one step pertinent to each feed-dog, the relation of curtain to dogs being such that if a dog be rocked outwardly upon its pivot its upper end will come under its appropriate step of the curtain and intercept the downward movement of the curtain when that step meets the displaced dog; 115, a forward extension of this curtain-lever, provided at its forward end with a roller to engage a cam on the driving-shaft; 116, a facially-grooved cam on the driving-shaft, engaged by lever 115 and adapted to produce one descent of the curtain at each rotation of the driving-shaft, the cam having a long idle "dwell," so that the downward motion of the curtain and its return to normal position is performed during a small portion of the rotation of the driving-shaft; 117, a pin projecting from the side of each of the dog-links; 118, a comb-plate standing in front of these pins; 119, a bell-crank lever carrying this comb-plate upon one of its arms and presenting its other arm near the driving-shaft, and 120 a quick-acting wiper-cam carried by the main shaft and sweeping the second arm of the comb-lever, so that at each rotation of the driving-shaft all of the links will be pushed rearwardly to normal position, holding the dogs in normal rank clear of the curtain, this cam, however, being in idle position when the driving-shaft is in its normal stationary position. If the driving-shaft makes a rotation, the curtain will go down and then up again, and all will come to rest and the stroke of the curtain will have a definite and uniform measure. All of the dogs being forward of the curtain, the curtain normally engages none of them. Consequently the dog-arm 105 will not have partaken, generally, of the motion of the curtain-lever; but it will be noticed by inspecting Fig. 24 that the descent of the curtain will finally bring the lowermost step in contact with the inner portion of dog-arm 105, and when this occurs the dog-arm will begin to partake of the descending motion of the curtain. When the curtain-arm rises, it engages under the dog-arm and raises it to normal position. Disregarding the dogs, it will therefore be seen that there is lost motion between the dog-arm and the lowest step and that the actual downward motion imparted to the dog-arm will be the difference between this lost motion and the total of curtain motion. Let this difference be the unit of motion to be imparted to feed-pawl 65. This is the minimum feed of the machine, and this amount of feed at least will result at each impulse of the machine. Therefore, if we wish to produce a "space" having one unit of value we can produce it by any process which will start the machine. Referring for a moment to Fig. 1, let it be remembered that finger-key 15 is the minimum spacing-key or unit-spacing key. It does its work by the simple act of starting the machine. In Figs. 21 and 22 this unit-spacing finger-key is illustrated. Its lower end rests over starting-bar 112, and it follows that if the key be depressed the clutch-lever will be rocked, the push-pin pushed, the driving-shaft make one rotation, the dog-arm given one degree of descent and then return to the normal position, the feed-ratchet 62 advanced for one unit of feed, and the pad moved one unit to the left. Certain of the types require but one unit of feed—a comma, for instance—and therefore the finger-key pertinent to that type would, so far as feed admeasurement is concerned, require only to start the machine; but some of the characters must add to this unit of feed, and other space-keys designed for increased spacing without the need of consuming the time of several machine-impulses must also add to the unit of feed. Referring to Fig. 24, it will be noticed that if any dog be swung rearwardly the appropriate curtain-step will catch its upper end and the dog-arm will be moved down. Let the lost motion be six units of feed. One unit of motion will be produced with no dog in action. The steps are so arranged with reference to the dogs that the balance of the lost motion is apportioned between the steps. If the right-hand dog (seen in Fig. 24) be brought under its step, there will be practically no lost motion, and the entire motion of the curtain corresponding to seven units of feed would be transmitted to the dog-arm and to the feeding devices. With the second dog in action one unit will be lost and six units will be transmitted, and so on, the left dog permitting five units to go to waste and two to be transmitted to the feeding devices. It will, therefore, be seen that one unit of feed will always take place and that units may be added by rocking rearwardly an appropriate dog. Each dog has its individual tumbling-shaft 108, and therefore the number of units of feed in excess of one unit can be determined by rocking a selected tumbling-shaft to pull forward on the proper link and bring into action the proper dog. Cam 120 does not interfere normally with pulling back any link; but after a link has been pulled back and a dog displaced the driving-shaft rotates and produces the desired motion, and before coming to rest the dog is replaced by the action of cam 120. Levers 109 reach forward from the desired tumbling-shafts and pass between the stems of the finger-keys and may be engaged by the pins 111 on such of the finger-keys as desired. A single lever from a tumbling-shaft may be engaged by all of the keys in the two rows between which it passes, if all of those letters call for the same spacing, or two levers from two different tumbling-shafts may go between the rows and give those rows the choice of two degrees of feed, or levers may extend but far enough to reach desired ones of the keys, or if a given key calls for only one unit of feed, so as not to require any dog, then such key may be without a dog-setting pin. The comprehensive capacity of the system will be understood from a slight study of the exemplifying distribution illustrated in Fig. 122. In this figure the three lowermost keys of the figure may be assumed as mere spacing-keys to produce, respectively, two, three, and four units of feed. They do nothing but set the proper dog and then start the machine.

Let it be particularly noticed that in the admeasurment of the feed one finger-key may require to measure one quantity, while its nearest neighbor requires to measure a different quantity, and while a far-distant key may also require to measure the same quantity. In other words, the feeding duty of a key is dependent not on its position in the keyboard, but on the feed pertinent to its type character. Levers may go from the various tumbling-shafts to between the keys, as required to accomplish the necessary feed; but in practice we have found that an ordinary English font of characters readily lends itself to such a convenient distribution on the keyboard that contiguous transverse rows of keys may generally operate upon a single feeding-lever disposed between them, so that there will be fewer levers than there are transverse rows of keys. The feeding-levers 109 may be attached to their tumbling-shafts in any convenient manner; but it is our preference that all of the shafts be pierced in line between each row of finger-keys and that the feeding-levers be attached at these holes by shanks engaging the holes, as indicated in Fig. 21. This system permits of a redistribution of the feeding-levers without the necessity for removing the tumbling-shafts from the frame. Changes of English font do not call for a redistribution of these levers, as proportion of body remains the same with different fonts; but if a German font, for instance, be employed the feeding-levers will most likely require a redistribution, and the illustrated method of attaching the levers to their tumbling-shafts will be found quite convenient. The comb-plate brings all the feeding-levers to normal position and then permits any feeding-lever to be depressed by the action of a finger-key. In order to prevent the accidental dropping of feeding-levers 109, they should be counterbalanced or, what is preferred, gently held in normal position by spring-plunger engaging a notch in the lever, as illustrated in Figs. 21 and 22. Such a retaining-spring plunger need not be provided for each of the feeding-levers, it being sufficient that one is provided for each tumbling-shaft.

*Admeasurement of type-case lift*, (Figs. 25, 26, 27, and 28.)—The devices for this purpose bear much similarity to those employed for the admeasurement of the feed, a cam on the driving-shaft producing a lifting motion, and dogs under the control of the finger-keys determining how much of the motion shall be utilized; but in this case the dogs, instead of forming a rank of pivoted levers rocked by links, form a rank of sliding plungers pushed out into action by cams operated by links. Again, in the case of the feed there was some measure of feed movement pertinent to each finger-key; but as regards type-case lift five rows of type in the type-case calls for but four degrees of lift, the upper row being normally at the level of the line of collimation. It has been before stated that the outer row of finger-keys represents the upper row of types, and it will therefore be understood that the outer row of finger-keys need actuate no case-lifting devices. Again, in the case of the feed the measure was a matter pertinent to each type, and therefore to each finger-key, while they might permit themselves to be arranged into groups having common measure; but as regards type-case lift the measure pertains entirely to the longitudinal rows, all of the types of one row calling for no lift, the next row one degree of lift, &c., four degrees of lift being required for the type-case shown in the exemplifying-machine. It will therefore be understood that all of the types in one row on the keyboard will operate to the same degree on the lift-measuring devices. Fig. 25 is a side elevation, with parts in vertical section, of the case-lifting and lift-measuring mechanism; Fig. 26, a plan of the same; Fig. 27, a side elevation of the dog and curtain-arms enlarged; and Fig. 28, a rear view of the latter parts, it being understood that the keyboard edge of the machine is always referred to as the "front of the machine." Referring to these drawing-figures and bearing in mind that 2 is the driving-shaft, 7 the line of collimation, 9 the type-case, and 112 the starting-bar, which when pressed down will operate the push-pin and cause the driving-shaft to make a complete revolution and then come to rest. 121 indicates a rock-shaft parallel with the driving-shaft and hereinafter termed the "lift-shaft;" 122, an arm fast on this shaft and connected by a link with the case-lifter 47, which has been heretofore fully explained; 123, a second arm fast on the lift-shaft and hereinafter termed the "lift-dog arm," the type-case therefore lifting in proportion to the rock of the lift-dog arm; 124, an arm loose on the lift-shaft and rocked by a cam on the driving-shaft; 125, the lift-cam fast on the driving-shaft and engaging the end of this arm, this cam in the exemplification being a facially-grooved cam and having such form as to quickly give arm 124 its maximum rock in one direction and then hold it there for quite a while and then quickly return it to normal position, as indicated in Fig. 25, and so retain it while the driving-shaft is at rest; 126, an integral rearward extension of the cam-arm; 127, a curtain carried by this extension and adapted to move freely by the end of the dog-arm 123, the upper edge of this curtain being provided with four steps to be engaged by the dogs; 128, four plunger-dogs arranged to slide in the dog-arm and to stand normally back, so as not to engage the steps of the curtain, as seen in Fig. 25, the outer ends of these dogs being adapted to be projected outwardly from the dog-arm, so as to be in position to engage over the curtain-steps; 129, four slotted cams mounted on the lift-shaft within the dog-arm, each cam engaging one of the plunger-dogs, which plunger-dogs will be hereinafter termed the "feed-dogs," these cams being adapted to rock freely on the lift-shaft, the operating-grooves of the cams being such that when swung to one position they hold the dogs inwardly, and when swung to the other position they push the dogs outwardly, each cam being independent of its neighbor; 130, four tumbling-shafts mounted in the frame of the machine to the rear of the keyboard and parallel with the driving-shaft, each shaft being provided with an upwardly-projecting arm; 131, links, one for each cam, each connecting a feed-dog cam with one of the tumbling-shafts; 132, arms connected with the feed-tumbling shafts and projecting forward toward the finger-keys, the arms of one shaft reaching forward as far as the nearest row of finger-keys, that of the next shaft to the next row, and so on; 133, lift-blades arranged horizontally alongside each longitudinal row of finger-keys, except the front row, these blades being rigidly attached and carried by the forward ends of the appropriate ones of arms 132; 134, pins projecting from the stems of the finger-keys over the lift-blades, whereby the depression of a finger-key will depress a lift-blade; 135, a projection from cam-lever 124, engaging over the dog-arm and serving to rock the dog-arm downwardly and insure the descent of the type-case as the cam-arm 124 returns to normal position, and 136 a long pin or bar projecting from units-space key 15 and passing under all of the lift-blades.

As seen in Fig. 25, the parts are in normal position, the type-case being down. If the driving-shaft makes its rotation, the feed-cam will cause the curtain to rise; but no effect will have been had on the lift-shaft, the dogs all being back. This is the action for the front row of finger-keys corresponding with the top row of type, and this is the action if a mere spacing-key, as units-key 15 or greater spacing-key 16 be employed. If, however, any finger-key in the second row from the front be depressed, it will depress the front lift-blade and cause the rocking of the outer dog-cam and an outward projection of the outer dog, and, it being understood that all finger-keys will be arranged to operate the push-pin and start the driving-shaft into motion, the driving-shaft will start and the curtain will rise and its outer step will engage the projecting dog, and then the dog-arm will partake of the motion of the curtain-arm and the lift-shaft will turn a distance and produce one degree of lift for the type-case, and in this condition the concentric part of lift-cam 125 holds the type-case while other operations are being performed by the motion of the driving-shaft, and while those operations are being "undone," so to speak, the feed-cam eventually restoring the parts to the normal position shown in Fig. 25. Other rows of finger-keys project other dogs and bring other curtain-steps into action and give greater lifting motion, as will be obvious from a study of the drawings.

It will be remembered, especially by reference to Fig. 5, that cam 26, operated near the end of the rotation of the main shaft, restores push-pin lever 24 to normal position. It is therefore obvious, viewing Fig. 25, that when the driving-shaft shall have completed its rotation it will have lifted starting-bar 112 to normal level. Units-spacing key 15 rests on this bar, its whole performance being to push the bar down and start the driving-shaft. Therefore, when the driving-shaft comes to rest it will have pushed units-space key 15 up to normal position. Pin 136 in this spacing-key and under all of the lift-blades therefore insures that when the driving-shaft has completed its rotation all of the lift-blades will be up and all of the lift-dogs will be retracted.

*Admeasurement of type-case swing*, (Figs. 29, 30, 31, and 32.)—Referring to Fig. 9 for a moment, it will be remembered that the swing of the type-case was produced by rack 51, which was to turn the swing-shaft 10 in the direction and to the degree called for by a given type-key. In the exemplifying type-case there are ten vertical rows of type at each side of the center and the central position is the normal one. Therefore there are two directions of swinging motion to be chosen from and ten degrees of swinging motion to be chosen from each of these directions. Each type-key operates on the swing-measuring mechanism, and it will be readily understood that the type-keys fall into groups of five, each type in a given vertical row of type calling for the same degree of swing in the same direction. It has been stated that the general position of the keys on the keyboard corresponds to the position in the type-case, except a certain reversal, upper rows of keys corresponding with lower rows of type, right-hand keys corresponding, however, with the right-hand of the type-case. Hence type-keys at the right all produce a swing to the left, and type-keys to the left produce a swing to the right, and type-keys in the rows nearest the center produce the first degree of swing, the next row the second degree, and so on, the extreme outer rows calling for the tenth degree of swing.

In the drawing-figures now under consideration, Fig. 29 is a vertical section of the swing-rack and its operating and controlling devices; Fig. 30, a front elevation part longitudinal section of the same; Fig. 31 a plan of the same, and Fig. 32 a bottom view of the rack. It will be remembered that 48 is the shank which supports the type-case; 10, the shaft which swings the type-case; 50, a toothed sector fast on this shaft; 51, the rack which has a sliding motion across the machine to rock the sector 110, exemplifying one of the type-keys, and 2 the driving-shaft.

We now proceed to consider additional parts pertinent to swing-measurement. 137 indicates a pair of blocks arranged for sliding motion in a raceway underneath and parallel with the swing-rack, each of these swing-blocks being near half the length of the rack; 138, two peripherally-grooved cams fast on the driving-shaft, their grooves having a form adapted to produce at each rotation of the driving-shaft a separating motion of the two swing-blocks, the amount of motion on the part of each block being slightly in excess of the maximum endwise motion ever required by the swing-rack; 139, roller-stems projecting from each swing-block into engagement with its cam, whereby a rotation of the driving-shaft moves both blocks outwardly and then returns them to normal inward position; 140, a set of pins carried by the swing-blocks and arranged for vertical motion therein, there being a pin for each degree of swing pertinent to a block—namely, ten pins, arranged in two ranks side by side—so as to permit the use of a short rack and short swing-blocks, the normal position of these pins being down, so that their upper ends are entirely free from the rack; 141, the floor of the raceway in which the swing-blocks slide, this floor supporting a pin when it is up and having holes permitting the pins to come down into normal position when the blocks are at their inward or normal position; 142, a swing-blade disposed one against each row of type-keys and arranged for vertical motion in the frame of the machine, these blades being illustrated as having a T-form for the sake of lightness; 143, a series of levers pivoted to the frame of the machine, one for each short row of type-keys, the front end of each lever engaging one of the swing-blades 142, so that downward motion of the swing-blade will produce an upward motion of the rear end of the lever, the rear end of each lever presenting a finger under one of the buttons or block-pins; 144, a pin projecting from the stem of each type-key, all the pins of one short row of type-keys engaging above a swing-blade pertinent to that row; 145, a button upon the lower end of each of the block-pins, these buttons projecting normally below the floor of the raceway and occupying a position above that floor when the pin is pushed upward into action, a spring on each pin holding the pin normally down; 146, the holes in the floor of the raceway, one under each pin when the blocks are at their inward or normal position, these holes being large enough to permit the buttons to pass from below the floor to above the floor as the pins are pushed up, and having outward narrow extensions or slots to permit the movement of the pins with the blocks as the blocks move outwardly, these holes in the raceway-floor thus having the form of buttonholes normally above the buttons; 147, two spiral-spring plungers carried by the swing-rack, one at each end of the rack, and pressing outwardly against the frame of the machine, these plungers having stops to limit their outward projection, whereby the plungers tend to hold the rack in its normal central position; 148, recesses in the lower surface of the rack, one over each block-pin, these recesses being of differing length, the shortest recesses, those pertinent to the extreme outer row of type-keys, being so short that if a pin from an outwardly-moving block engages the recess the rack will move with the block nearly the full stroke of the block, the longer recesses, however, permitting the block to move some distance before the pin begins to move the rack; 149, the spiral springs on the block-pins to keep the block-pins down in normal position with the buttons below the raceway-floor, the springs engaging over collars on the pins working within counterbores in the blocks, and 150 coiled springs on the levers to keep the levers in normal position corresponding with the upward position of the swing-blades and downward position of the block-pins. Normally the driving-shaft is stationary and the two swing-blocks are inward and all the block-pins down and all the finger-keys and swing-blades up. If by any means whatever the machine be started, the driving-shaft will make one rotation and then come to rest, and during this rotation the swing-blocks will have been moved outwardly and held so for a time and then returned to normal position. All the block-pins being down, the rack received no motion from the blocks and there would have been no swing of the type-case. Such is the action if a spring-key be depressed; but if any type-key be depressed it will press upward the block-pin pertinent to that row of type-keys. The touch on the finger-key first pushes up the pin and eventually starts the machine. The buttonhole in the floor at this pin will allow the pin to go up. The block then drags the rack with it by the engaging pin and the pin cannot descend until the block has brought it back over the proper part of the buttonhole, and at the same time the form of the buttonholes will not allow any other of the pins going up while the block is in motion. In short, after the block is in motion the pin that is up cannot come down and those that are down cannot go up. Finger-keys at the right hand of the keyboard deal with block-pins of the right-hand block and swing the type-case to the left to bring into action the right-hand type. The direction of swing is therefore determined by which side of the keyboard the selected finger-key is on. The degree of swing is governed by the length of the recesses 148. There is a pin for each recess and that pin is operated by a certain swing-blade from a certain row of finger-keys, and the length of that recess is such as to cause its pin, if called into play, to transmit from the block to the rack an amount of endwise motion corresponding to the case-swing called for by types pertinent to that row of finger-keys.

It has been heretofore explained that each finger-key, no matter what else it might do, must have the eventual effect of depressing the starting-bar 112 to project the push-pin and start the machine. The swing-blades 142 offer a convenient means for placing all of the type-keys in communication with the starting-bar, the lower end of all these blades resting upon the starting-bar, and the side pins 144 of all the type-keys resting on swing-blades. Consequently pressure on any type-key will depress a swing-blade and set the proper block-pin and eventually depress the starting-bar, as will be readily understood from an inspection of the drawings representing the complete assemblage of parts. The starting-bar is forced up again by the clutch-cam, as heretofore explained, and consequently when the driving-shaft comes to rest the swing-blades and the finger-keys will have been forced up to normal position, and it will be readily seen that while the driving-shaft is in motion, installed by the action of a finger-key, and the clutch-cam has forced the starting-bar up no finger-key can be depressed until the shaft completes its rotation and comes to rest, whereupon any finger-key may be depressed.

Provision is made for preventing any possible overthrow from erratic action of the type-case as it makes its swinging motion, and provision is also made for bringing it back positively and accurately to the normal central position; but in explaining the swing-measuring devices it has been thought best to ignore these last-mentioned features entirely and to explain them under a separate head.

*Case-swing lock*, (Figs. 33, 34, and 35.)—As thus far explained, the swing-rack is held in central position by the spring-plungers; but this is an elastic holding, and provision is made for a positive central locking of the swing-rack. Again, the block-pins move the swing-rack by pushing against the outer walls of the recesses in the rack. The recesses all have excessive length, and the movements being somewhat quick the momentum of the parts might cause an overflow of the type-case or at least a trepidation in the motion. Provision is made for interposing an obstruction to the improper forward swing of the type-case, this obstruction interposing itself at precisely the right time to suit the given degree of swing and then taking a locking hold upon the swing parts and maintaining them in accurate position of swing until the time has arrived for the return of the parts to normal position.

Fig. 33 is a front elevation of the swing-blocks and swing rack and sector, showing, also, the additional parts to effect the locking of the swing, the parts showing the case-shank 48 as having been swung far to the left and there locked; Fig. 34, a plan of the same, but with the parts in normal central position, and Fig. 35 a vertical transverse section of the parts.

151 indicates a pair of swing lock-blocks arranged to slide in a raceway in the main frame over the rack, one block to the right and one block to the left of the sector; 152, an inwardly-facing toothed segment carried by each of these lock-blocks, each segment having as many teeth as there are swinging positions which it is to lock—namely, ten in the exemplifying-machine; 153, two lock-fingers projecting outwardly from the swing-sector and adapted to engage the teeth of the lock-segments, the length and position of these finger being such that when the parts are in normal central position, swing-shank 48 being vertical, the fingers will stand above the segments and not reach out to the segments; 154, a link connecting the right-hand swing-block with the left-hand swing lock-block, so that that lock-block moves with that swing-block; 155, a similar link similarly connecting the left-hand swing-block with the right-hand swing lock-block, and 156 a projection downward from the center of the swing-rack to between the swing-blocks, the width of this projection being such as to fill the gap between the swing-blocks when the swing-blocks are at their normal inward position. Normally the swing-blocks occupy their inward position, being held there by the swing-cams. Their inner ends engage the projection 156, and consequently the swing-rack and the type-case are firmly and accurately held in central position. When the swing-blocks separate, this locking hold upon the projection is released and the swing-rack is at liberty to be moved endwise by any selected block-pin. As the swing-blocks move outwardly the swing lock-blocks and their toothed segments move inwardly, and when the swing-blocks have reached their extreme outer position, and they always make this definite and constant stroke, the toothed segments will have approached each other till they are concentric with the swing-shaft 10, in which position their teeth will correspond with the radial length of the fingers on the sector. During this approach of the toothed segments the swing is taking place, and at the precise instant when one of the lock-fingers 153 has descended to a position corresponding to the given degree of swing it will meet an appropriate tooth in a toothed segment and can go no farther, nor can it retreat. The swing-shaft 10 thus becomes locked in the proper position of swing and is not released till the swing-blocks again begin to approach each other, the first act then being to release the stop-finger from the toothed segment. In the exemplification there are two of the stop-blocks and toothed segments and stop-fingers, one set acting for the ten degrees of swing to one side of the center and the other to the other, but, if desired, one toothed segment may contain the twenty teeth and one stop-finger answer the purpose; but the advantage of the illustrated construction rests largely in the substantially-vertical disposition of the comparatively-short toothed segments, whereby the horizontal motion of those segments is best adapted to bring the segments within the range of the fingers.

*Finger-key construction*, (Figs. 41, 42, 43, 44, and 45.)—Heretofore in this description the finger-keys have been shown rudimentally in connection with each mechanism in which they took part. They will now be more completely described. Fig. 41 is an elevation, part section, of one of the type-keys; Fig. 42, a bottom view of one of the frame-plates in which the finger-keys are guided; Fig. 43, a perspective view at the base of the spacing-keys at the end of the keyboard, showing how those keys act on the starting-bar; Fig. 44, a side elevation of the machine with the frame shown in section, and Fig. 45 a plan of an exemplifying-keyboard. Let it be remembered that 110 has been taken as indicating type-keys generally; 16, the three spacing-keys at the left hand of the keyboard and having spacing values of five, six, and seven units, respectively; 112, the starting-bar whose depression pushes the push-pin and starts the machine; 15, the units-spacing key; 111, pins in the type-keys to admeasure the feed; 134, pins in the type-keys to admeasure the case-lift, and 144 pins in the type-keys to admeasure the case-swing.

Proceeding now to further details, 166 indicates the top plate of the keyboard, perforated to form guides for the stems of the finger-keys; 167, a guide-plate supported by the frame below the top of the keyboard and forming lower guides for the finger-keys; 168, spring-plungers arranged within the finger-keys hollow to receive the plungers at about the level of this guide-plate, the stems of the finger-keys being vertically slotted at these plungers; 169, a spring within each finger-key, above its plunger, of a strength sufficient to support the finger-key; 170, abutment-strips secured to the guide-plate along each row of finger-keys, each strip having teeth which project freely into the slots of the finger-keys and support the spring-plungers, the plungers thus abutting on the teeth and pressing the keys upwardly as far as the swing-pins 144, coming against the under side of the keyboard, will permit; 171, arms projecting from the non-central ones of the spacing-keys 16 and engaging over the starting-bar 112. The finger-keys are arranged in close ranks, increasing in height inwardly, so as to be readily accessible to the operator's fingers. The spring-plungers hold them up neatly to normal position, regardless of any slight loss of motion there might be in the swing-blades 142. The swing-blades all rest on the starting-bar 112, and this starting-bar is automatically forced up by the clutch-cam before the driving-shaft comes to rest. Each type-key has a pin 144, engaging a swing-blade, and consequently the type-keys are positively lifted; but the spring-plungers relieve the swing-blades and starting-bar from the weight of the type-keys and give an elastic resistance to the fingering of the keys. Each type-key is provided with pins 111, 134, and 144, engaging its appropriate admeasuring part, it being understood, however, that type-keys in the front row require no lift-measuring pins 134 and that type requiring only a single unit of feed require no feed-measuring pins 111. It will therefore be seen that each type-key engages over a swing-blade and that all swing-blades rest on the starting-bar, and that therefore the depression of a type-key means the depression of the starting-bar. The units-spacing key 15 rests directly on the starting-bar, and consequently the depression of that key will start the machine. The six other spacing-keys are arranged, preferably, three at either end of the keyboard, one in each group directly over the starting-bar. Those spacing-keys over the starting-bar will therefore start the machine when depressed. The spacing-keys to the front and rear of the starting-bar operate on the starting-bar through the medium of arms 171, (seen in Fig. 43.)

An exemplifying distribution of finger-keys is seen in Fig. 45. The distribution may be as desired and is best arranged with reference to superior accessibility of keys most often used and with reference to fewness of feed-levers 109, it being found preferable to effect such a distribution of letters with reference to their spacing requirements that two contiguous short rows of keys will call for the same spacing value, and thus permit the action of these keys on a single feeding-lever 109, disposed between these rows, feed-measuring pins 111 being omitted from type-keys which call for only a single unit of feed.

The distribution shown in Fig. 45 illustrates quite a comprehensive English font in connection with the exemplifying machine of one hundred type-keys, four keys at the left remaining still unappropriated, and thus permitting additions. The black keys are the spacing-keys.

*General assemblage*, (Figs. 1, 40, 44, 45, and 46.)—The machine may well take the form, as illustrated, of a rectangular box-like frame containing the most of the mechanism and having the plunger-support, the face-plate, the type-case, and the carriage-rail projecting above it, the keyboard being at the front of the top of the machine and the pad-holder facing toward the operator at the keyboard. The driving-shaft 2 is disposed across the frame below its top, and on it are secured the several cams which restore the push-pin and operate the feed-curtain, and operate the lift-curtain, and operate the plunger, and operate the swing-racks. This driving-shaft, with its cams, forms the heart of the machine, the effect of whose beat at each rotation is admeasured by the subordinate devices under the control of the finger-keys.

*Operation.*—The pad material is to be secured in the pad-holder, and the rail and anvil adjusted in position to or from the type-case, so that the plunger will give to the type a forward or impressing motion suited to the thickness of the pad material in hand. The left-hand stop 70 is adjusted to suit the line end or column-width of the work to be produced. Change-gears are applied to produce a unit of feed appropriate to the type-font in hand. Finger-lever 97 is adjusted to give a line-lift appropriate to the work in hand, and the pad-holder is brought to position for initiating the work. The appropriate type-key being depressed first projects a lift-dog to determine the degree of type-case lift, and sets a block-pin to determine the degree of type-case swing, and sets a feed-dog to determine the degree of pad-feed, and then pushes the push-pin and the driving-shaft makes its rotation. The effect of this rotation of the driving-shaft is, first, to lift the type-case the admeasured degree; second, swing the type-case the admeasured degree; third, advance the plunger and impress the type; fourth, retract the plunger; fifth, advance the pad the admeasured degree; sixth, swing the type-case back to the central position; seventh, lower the type-case to the normal position; eighth, pull back the push-pin, and, ninth, come sharply to rest with all the parts in normal position. During the motions all of the admeasuring devices have been locked—the adjusted ones in set position and the others in normal position. The next type-key is then depressed, and so on and on throughout the work. Type-keys in the outer row measure out no work to the case-lifting mechanism, and type-keys calling for but a single unit of feed measure out no work to the feed-admeasuring mechanism, a unit of feed being inherent in a rotation of the driving-shaft. If a unit of space is wanted without impression from a type, units-spacing key 15 is depressed, the driving-shaft thereupon making its complete rotation and producing a unit of pad-feed and producing an idle plunger-stroke, but no lift or swing of the type-case. If a space greater than a unit of feed is required without an impression of a type, the appropriate spacing-key is depressed, the effect being the same as with the units-space key, except that a feed-dog is set, thus increasing the degree of pad-feed. When the last letter of a line is struck, the stop-rod releases the feed-ratchet from the restraint of its stop-pawl and the backing-pulley instantly returns the pad to the position corresponding with the beginning of a line, and during this return of the pad the pad-lift pawls lift the pad to the level of a new line, whereby the next letter will be impressed at the beginning of the new line. During the return of the pad for the start of a new line the push-pin has been locked, so that even the most nimble-fingered operator could not impress the new letter before the pad is in proper position to receive it.

We claim as our invention—

1. In a typographic machine, the combination, substantially as set forth, of a frame, a fixed plunger-guide and abutment supported by said frame in a line of collimation, a reciprocating plunger in said guide, a movable case of parallel types disposed in front of the plunger, a pad-carriage disposed in front of the type-case, an anvil disposed in said line of collimation in front of and adjustable to and from said pad carriage and abutment, forcing means acting between the plunger and abutment, and a finger-key and connections for each type.

2. In a typographic machine, the combination, substantially as set forth, of a frame, a fixed plunger-guide and abutment supported by said frame in a line of collimation, a reciprocating plunger in said guide, forcing means acting between the plunger and abutment, a movable case of parallel types disposed in front of the plunger, a rail supported by the frame in front of the type-case and below the line of collimation, a pad-carriage mounted on the rail and projecting above the same, a fixed anvil disposed in the line of collimation and projecting over the rail and through the pad-carriage, and a finger-key and connections for each type.

3. In a typographic machine, the combination, substantially as set forth, of a frame, two parts projecting upwardly and rigidly therefrom and carrying in a line of collimation one an endwise-adjustable anvil and the other an abutment, a pad-carriage, a type-case of endwise-movable types, a plunger disposed in the space between said anvil and abutment, forcing means, as a toggle, between the plunger and abutment, and a finger-key and connections for each type.

4. In a typographic machine, the combination, substantially as set forth, with a type-case containing types arranged to be dealt with singly as brought into a line of collimation by the movement of the type-case, of a finger-key pertinent to each type, a part moving up and down by power a constant distance at each impulse of the machine to provide for lifting the type-case, a case-lifter, dogs for causing the motion of said power-moved part to be imparted to the case-lifter in degree according to the dog brought into action, connections from the dogs to the appropriate finger-keys, whereby a finger-key brings an appropriate dog into action, a driving-shaft, a cam thereon, and connections between said cam and the dogs, whereby at each rotation of the cam all dogs are restored to normal idle position.

5. The combination, substantially as set forth, of a shaft, a toothed pulley loose thereon, a fixed notched rim, a driver on the shaft, a sliding pin to push the driver from the notch, a lever, a connection from the lever to the pin, a cam to withdraw the pin, and connections from the cam to said lever and pin.

6. In a typographic machine, the combination, substantially as set forth, with a pad-holder, types, type-impressing mechanism, a driving-shaft, unit-feed devices to positively advance the pad-holder a unit of distance at each rotation of said shaft regardless of the type requirement, and a finger-key for each type, of a feed-adding mechanism for advancing the pad-holder more than a unit of distance, and connections from some but not all of said finger-keys to said feed-adding mechanism.

7. In a typographic machine, the combination, substantially as set forth, with a pad-holder, types, type-impressing mechanism, a driving-shaft, and a finger-key for each type, of a pulley, a stop-clutch to turn the shaft and arrest it at the end of one rotation, a part to be moved to engage the clutch with the shaft, and connections from all the finger-keys to said starting part.

8. In a typographic machine, the combination, substantially as set forth, with a pad-holder, a movable type-case, a type-impressing plunger, pad-feeding devices, type-case-moving devices, and a driving-shaft to actuate the type-movements and pad feeds, of dogs to admeasure the degree of pad feed to be produced by said driving-shaft, dogs to admeasure the type-case movement, a part to be moved to start the driving-shaft, and finger-keys connected with said dogs and starting part.

9. In a typographic machine, the combination, substantially as set forth, of a pad-holder, a movable type-case, endwise-movable types in the type-case to be brought singly to a line of collimation by the movement of the type-case, a fixed anvil engaging the back of the pad, a plunger reciprocating in the line of collimation and adapted to impress a type in said line to a pad on the pad-holder, a driving-shaft arranged to reciprocate the plunger a definite distance at each rotation, and a finger-key for each type for starting said shaft.

10. In a typographic machine, the combination, substantially as set forth, with a pad-holder, a type-case, types, a plunger, and a finger-key for each type, of a driving-shaft, a cam thereon, a pressure-finger near the impression-point of the pad-holder, and connections from said cam to said plunger and pressure-finger.

11. In a typographic machine, the combination, substantially as set forth, with a pad-holder, a movable type-case, types, type-impressing mechanism, and a finger-key for each type, of a power-driven driving-shaft, a stop-clutch, a part to be moved to start the driving-shaft, a unit-space finger-key, and connections from said unit-space key to said starting part.

12. In a typographic machine, the combination, substantially as set forth, with a pad-holder, a movable type-case, types, type-impressing mechanism, and a finger-key for each type, of a driving-shaft, a stop-clutch, a part to be moved to start the driving-shaft, connections from said finger-keys to said starting part, a cam on the driving-shaft, having a low place to permit the depression of any key and an immediately-following swell to lift all finger-keys, and connections from said cam to all the finger-keys.

13. In a typographic machine, the combination, substantially as set forth, with a pad-holder, types arranged to be dealt with singly, type-impressing mechanism, a power-driven actuating-shaft, and a finger-key for each type, of a constant-stroke feed part moved by said actuating-shaft at each impulse of the machine to provide for feeding the pad-holder, a variable-stroke feed part moving in accordance with the degree of pad feed, dogs for causing the motion of said constant-stroke part to be imparted to said variable-stroke part in degree according to the dog brought into action, connections from the dogs to appropriate type-keys, a space-key for each dog, and a connection from each space-key to a dog.

14. The combination, substantially as set forth, of a shaft, a toothed pulley loose thereon, a driver secured to the shaft by a transverse pivot and adapted to engage the pulley, and means for rocking the driver on its pivot into and out of engagement with the pulley.

15. The combination, substantially as set forth, of a shaft, a toothed pulley loose thereon, a fixed notched rim, a driver secured to the shaft by a transverse pivot and arranged to engage the pulley and be so held by the rim and released at the notch, and a movable piece at the notch to push the driver out of the notch.

16. In a typographic machine, the combination, substantially as set forth, with a pad-holder and a plunger arranged to reciprocate in a line of collimation, of a type-case mounted on an axis of oscillation, endwise-movable types mounted parallel in said type-case and disposed in an arc struck from said axis, a finger-key for each type, two parts, as sliding blocks, moved by power simultaneously in respectively opposite directions, and connections between said blocks and type-case for transmitting motion to said type-case from said blocks alternatively.

17. In a typographic machine, the combination, substantially as set forth, with a pad-holder and a plunger arranged to reciprocate in a line of collimation, of a type-case mounted on an axis of oscillation, endwise-movable types mounted parallel in said type-case and disposed in an arc struck from said axis with a radius equal to the distance from said axis to said line of collimation, a finger-key for each type, two parts, as sliding blocks, moved by power simultaneously in respectively opposite directions, and connections between said blocks and type-case for transmitting motion to said type-case from said blocks alternatively.

18. In a typographic machine, the combination, substantially as set forth, with a pad-holder and a plunger arranged to reciprocate in a line of collimation and provided with a clutch-hook, of a type-case mounted on an axis of oscillation and arranged for radial adjustment with reference thereto, endwise-movable types mounted in several segmental rows in said type-case and having notched heels projecting toward and beyond the plane of the end of said plunger, and mechanism for normally holding said type-case in such angular position that no type will be engaged by the plunger, whereby the type-case may be shifted radially without interference from the overlapping plunger and type-heels.

19. In a typographic machine, the combination, substantially as set forth, with a pad-holder and a plunger arranged to reciprocate in a line of collimation, of a type-case mounted on an axis of oscillation and arranged to swing either way from the normal, endwise-movable types mounted parallel in said type-case and disposed in an arc located at each side of the normal radial plane of the line of collimation and struck from said axis, a finger-key for each type, means for bringing the types selectively to the line of collimation, and a lock to secure the type-case rigidly in central position instantly upon reaching the same.

20. In a typographic machine, the combination, substantially as set forth, with a pad-holder and a plunger arranged to reciprocate in a line of collimation, of a type-case mounted on an axis of oscillation in fixed location and arranged for radial movement to and fro from said axis, endwise-movable types mounted parallel in said type-case and disposed in several arcs, a finger-key for each type, and means for bringing said types selectively to to the line of collimation.

21. In a typographic machine, the combination, substantially as set forth, with a pad-holder and a plunger arranged to reciprocate in a line of collimation, of a type-case mounted on an axis of oscillation in fixed location and arranged for radial movement to and fro from said axis, endwise-movable types mounted parallel in said type-case and disposed in several arcs struck from said axis with a radius equal to the distance from said axis to the line of collimation, a finger-key for each type, and means for bringing said types selectively to the line of collimation.

22. In a typographic machine, the combination, substantially as set forth, with a pad-holder and a plunger arranged to reciprocate in a line of collimation, of a type-case mounted on an axis of oscillation and arranged for radial movement to and fro from said axis, endwise-movable types mounted parallel in said type-case and disposed in several arcs and in straight non-radial rows transverse to said arcs, a finger-key for each type, and means for bringing said types selectively to the line of collimation.

23. In a typographic machine, the combination, substantially as set forth, with a pad-holder and a plunger arranged to reciprocate in a line of collimation, of a type-case mounted on an axis of oscillation in fixed location and arranged for radial movement to and fro from said axis, endwise-movable types mounted parallel in said type-case and disposed at equal distances on several arcs, a finger-key for each type, and means for bringing said types selectively to said line of collimation.

24. In a typographic machine, the combination, substantially as set forth, with a pad-holder and a plunger arranged to reciprocate in a line of collimation, of a type-case mounted on an axis of oscillation in fixed location and arranged for radial movement to and from said axis, endwise-movable types mounted parallel in said type-case and disposed in several arcs located at each side of the normal radial plane of the line of collimation, and a finger-key for each type, and means for bringing said types selectively to the line of collimation.

25. In a typographic machine, the combination, substantially as set forth, with a pad-holder, a movable type-case, types movable endwise in the type-case, and type-impressing mechanism, of a rigid face-plate disposed between the pad-holder and type-case and engaging the front of the type-case.

26. In a typographic machine, the combination, substantially as set forth, of a movable type-case carrying a row of endwise-movable types, a plate having an eye for the passage of a type, and a rigid guide on said plate engaged by the type-case and serving to guide the row of types accurately past said eye.

27. In a typographic machine, the combination, substantially as set forth, with a pad-holder, a movable type-case, types movable endwise in the type-case, and type-impressing mechanism, of a rigid face-plate disposed between the pad-holder and type-case and having guide-ribs and teeth on the type-case to engage said ribs.

28. In a typographic machine, the combination, substantially as set forth, with a pad-holder, a movable type-case, types, and type-impressing mechanism, of a face-plate disposed between the pad-holder and type-case and having interrupted guide-ribs and teeth on the type-case at the interruption of said ribs and adapted to engage said ribs.

29. In a typographic machine, the combination, substantially as set forth, with a pad-holder, a movable type-case, types, and type-impressing mechanism, of a shaft of oscillation and a radial shank and socket uniting the type-case adjustably to said shaft.

30. In a typographic machine, the combination, substantially as set forth, with a pad-holder, a movable type-case, types, and type-impressing mechanism, of a shaft of oscillation and a radial shank and socket uniting the type-case adjustably and removably to said shaft.

31. In a typographic machine, the combination, substantially as set forth, of a type-case mounted for oscillation on an axis and arranged for radial movement with reference to said axis and a type-case lifter reciprocating in guides in a line radial to said axis and connected with the type-case by teeth having sliding engagement.

32. In a typographic machine, the combination, substantially as set forth, with a pad-holder, a movable type-case, types, and type-impressing mechanism, of a face-plate disposed between the pad-holder and type-case and having guide-ribs, a toothed type-case lifter, and teeth on the type-case normally engaged by said lifter and adapted to engage said guide-ribs.

33. In a typographic machine, the combination, substantially as set forth, with a type-case containing types arranged to be dealt with singly as brought into a line of collimation by the movement of the type-case, of a finger-key pertinent to each type, an arm moving up and down by power a constant distance at each impulse of the machine to provide for lifting the type-case, a case-lifter, dogs for causing the motion of said power-moved arm to be imparted to the case-lifter in degree according to the dog brought into action, and connections from the dogs to the appropriate finger-keys whereby a finger-key brings an appropriate dog into action.

34. In a typographic machine, the combination, substantially as set forth, with a type-case containing types arranged to be dealt with singly as brought into a line of collimation by the movement of the type-case, of a finger-key pertinent to each type, a driving-shaft, a lift-cam thereon, a moving arm operated through constant distance by said cam, a case-lifter, dogs for causing the motion of the cam-moved arm to be imparted to the case-lifter in degree according to the dog brought into action, and connections between the dogs and finger-keys whereby a finger-key brings an appropriate dog into action.

35. In a typographic machine, the combination, substantially as set forth, with a type-case containing types arranged to be dealt with singly as brought into a line of collimation by the movement of the type-case, of a finger-key pertinent to each type, a driving-shaft, a lift-cam thereon, a moving arm operated through constant distance by said cam, a case-lifter, dogs for causing the motion of said cam-moved arm to be imparted to the case-lifter in degree according to the dog brought into action, a dog-operating cam for each dog, and connections between said cams and finger-keys whereby a finger-key brings an appropriate dog into action.

36. In a typographic machine, the combination, substantially as set forth, with a type-case containing types arranged to be dealt with singly as brought into a line of collimation by the movement of the type-case, of a finger-key pertinent to each type, an arm moving up and down by power a constant distance at each impulse of the machine to provide for lifting the type-case, a case-lifter, dogs for causing the motion of said power-moved arm to be imparted to the case-lifter in degree according to the dog brought into action, a lift-blade along each rank of finger-keys pertinent to a given lift of type-case and engaged by the keys of that rank, and connections from the blades to the dog whereby a finger-key brings into action a dog appropriate to the rank of the key.

37. In a typographic machine, the combination, substantially as set forth, with a type-case containing types arranged to be dealt with singly as brought into a line of collimation by the movement of the type-case, of a finger-key pertinent to each type, an arm moving up and down by power a constant distance at each impulse of the machine to provide for lifting the type-case, a case-lifter, dogs for causing the motion of said power-moved arm to be imparted to the case-lifter in degree according to the dog brought into action, a tumbling-shaft connected with each dog, and connections from the keys to the tumbling-shafts whereby a finger-key rocks an appropriate tumbling-shaft and brings an appropriate dog into action.

38. In a typographic machine, the combination, substantially as set forth, with a type-case containing types arranged to be dealt with singly as brought into a line of collimation by the movement of the type-case, of an arm moving up and down by power a constant distance at each impulse of the machine to provide for lifting the type-case, a case-lifter, dogs for causing the motion of said power-moved arm to be imparted to the case-lifter in degree according to the dog brought into action, a rank of finger-keys for each degree of type-case lift, an additional rank of keys, and connections between said dogs and first-mentioned rank of keys whereby keys in those ranks bring appropriate dogs into action.

39. In a typographic machine, the combination, substantially as set forth, with a pad-holder, a swinging type-case, type-impressing mechanism, and a finger-key for each type, of a part, as a sliding rack, moving variably in correspondence with the type-case as it swings, a power-moved part, as a sliding rack, having a constant stroke sufficient for the maximum swing of the type-case, dogs arranged to connect said two parts and cause the motion of the power-moved part to be imparted to the variably-moving part in degree according to the dog brought into action, and connections between said finger-keys and dogs whereby a finger-key brings into action an appropriate dog.

40. In a typographic machine, the combination, substantially as set forth, with a pad-holder, a swinging type-case, type-impressing mechanism, and a finger-key for each type, of a part, as a sliding rack, moving variably in correspondence with the type-case as it swings, a power-moved part, as a sliding rack, having a constant stroke sufficient for the maximum swing of the type-case, dogs arranged to connect said two parts and cause the motion of the power-moved part to be imparted to the variably-moving part in degree according to the dog brought into action, connections between said keys and dogs whereby a finger-key may move an appropriate dog into action while the power-moved part is at rest, and an obstruction to prevent the displacement of the dogs while said power-moved part is in motion.

41. In a typographic machine, the combination, substantially as set forth, with a pad-holder, a swinging type-case, and type-impressing mechanism, of a part, as a sliding rack, moving variably in correspondence with the type-case as it swings, a power-moved part, as a sliding rack, having a constant stroke sufficient for the maximum swing of the type-case, dogs arranged to connect said two parts and cause the motion of the power-moved part to be imparted to the variably-moving part in degree according to the dog brought into action, a row of finger-keys pertinent to each degree of type-case swing, and connections from each row of keys to a dog whereby any key in a given row will bring into action a dog appropriate to that row.

42. In a typographic machine, the combination, substantially as set forth, with a pad-holder, a swinging type-case, type-impressing mechanism, and a finger-key for each type, of a part, as a sliding rack, moving variably in correspondence with the type-case as it swings, two power-moved parts, as sliding blocks, having constant stroke in opposite directions, dogs arranged to connect said power-moved parts with the variably-moved part and cause motion of the power-moved part to be imparted to the variably-moved part in direction and degree according to the dog brought into action, and connections between the finger-keys and dogs whereby a key brings into action an appropriate dog.

43. In a typographic machine, the combination, substantially as set forth, with a pad-holder, a swinging type-case, type-impressing mechanism, and a finger-key for each type, of a part, as a sliding rack, moving variably in correspondence with the type-case as it swings, a power-moved part, as a sliding block, having a constant stroke sufficient for the maximum swing of the type-case, dogs arranged to connect said two parts and cause the motion of the power-moved part to be imparted to the variably-moving part in degree according to the dog brought into action, a swing-blade engaged by each group of keys calling for the same degree and direction of type-case swing, and a connection from each blade to a dog appropriate to its degree and direction of type-case swing.

44. In a typographic machine, the combination, substantially as set forth, with a pad-holder, a swinging type-case, type-impressing mechanism, a finger-key for each type, a bar reciprocating in correspondence with the swing of the type-case, and a block moved by power a constant distance at each impulse of the machine, of movable pins in said block, a shoulder on said bar for each block-pin and of peculiar appropriate distance from each block-pin, and connections between keys and pins whereby a key will bring an appropriate block-pin in position to engage its bar-shoulder.

45. In a typographic machine, the combination, substantially as set forth, with a pad-holder, a swinging type-case, type-impressing mechanism, a finger-key for each type, a bar reciprocating in correspondence with the swing of the type-case, and a block moved by power a constant distance at each impulse of the machine, of a plate having buttonholes under said block, movable pins in the block and presenting heads below said plate which can rise at one point only in the length of the buttonholes, and connections from said keys to the pins whereby a key may push the head of an appropriate pin through a buttonhole and cause such pin to engage said bar.

46. In a typographic machine, the combination, substantially as set forth, with a pad-holder, a swinging type-case, type-impressing mechanism, a finger-key for each type, a bar reciprocating in correspondence with the swing of the type-case, and a driving-shaft, of a swing-cam on said shaft, a block moved with a constant stroke by said cam, dogs arranged to impart the block motion to said bar in degree according to the dog in action, and connections between said keys and dogs.

47. In a typographic machine, the combination, substantially as set forth, with a pad-holder, a swinging type-case, type-impressing mechanism, and a finger-key for each type, of a part, as a sliding rack, moving variably in correspondence with the type-case as it swings, a power-moved part, as a sliding block, having a constant stroke sufficient for the maximum swing of the type-case, dogs arranged to connect said two parts and cause the motion of the power-moved part to be imparted to the variably-moved part in degree according to the dog brought into action, a separate swing-blade engaged by each lot of finger-keys calling for the same swing motion of the type-case, and levers connecting said blades with their appropriate dogs.

48. In a typographic machine, the combination, substantially as set forth, with a pad-holder, a swinging type-case, type-impressing mechanism, and a finger-key for each type, of a part, as a sliding rack, moving variably in correspondence with the type-case as it swings, a power-moved part, as a sliding block, having a constant stroke sufficient for the maximum swing of the type-case, dogs arranged to connect said two parts and cause the motion of the power-moved part to be imparted to the variably-moved part in degree according to the dog brought into action, springs tending to hold the type-case in normal position, and connections between the finger-keys and dogs.

49. In a typographic machine, the combination, substantially as set forth, with a pad-holder, a swinging type-case, type-impressing mechanism, and a finger-key for each type, of a part, as a sliding rack, moving variably in correspondence with the type-case as it swings, a power-moved part, as a sliding block, having a constant stroke sufficient for the maximum swing of the type-case, dogs arranged to connect said two parts and cause the motion of the power-moved part to be imparted to the variably-moved part in degree according to the dog brought into action, a driving-shaft, a stop-clutch, a starting-bar to move and cause the machine to make an impulse, and connections between the finger-keys and dogs and starting-bar whereby a finger-key brings an appropriate dog into action and moves the starting-bar.

50. In a typographic machine, the combination, substantially as set forth, with a pad-holder, a swinging type-case, type-impressing mechanism, and a finger-key for each type, of a part, as a sliding rack, moving variably in correspondence with the type-case as it swings, a power-moved part, as a sliding block, having a constant stroke sufficient for the maximum swing of the type-case, dogs arranged to connect said two parts and cause the motion of the power-moved part to be imparted to the variably-moved part in degree according to the dog brought into action, a driving-shaft, a stop-clutch, a starting-bar to move and cause the machine to make an impulse, a clutch-cam on the driving-shaft, and connections between the finger-keys and dogs and starting-bar and cam whereby a finger-key brings an appropriate dog into action and moves the starting-bar and whereby the impulse of the machine restores the starting-bar and finger-key.

51. In a typographic machine, the combination, substantially as set forth, with a pad-holder, a swinging type-case, types, type-impressing mechanism, and a finger-key for each type, of a bar reciprocating according to the swing of the type-case and having a projection, a pair of power-moved reciprocating swing-blocks normally holding said projection between them, dogs in the blocks for connecting the blocks and bar, and connections between the keys and dogs.

52. In a typographic machine, the combination, substantially as set forth, with a pad-holder, a swinging type-case, types, type-impressing mechanism, and a finger-key for each type, of a segmental series of obstructions or teeth corresponding with degrees of swing of the type-case, a locking-finger connected and oscillating with the type-case, and devices to move said obstructions into the path of said locking-finger.

53. In a typographic machine, the combination, substantially as set forth, with a pad-holder, a swinging type-case, types, type-impressing mechanism, and a finger-key for each type, of a lock-finger oscillating with the type-case, a notched segment fixed against circumferential movement and normally free of said finger, and mechanism for bringing the segment to the finger as the case swings.

54. In a typographic machine, the combination, substantially as set forth, with a pad-holder, a swinging type-case, types, type-impressing mechanism, and a finger-key for each type, of a pair of lock-fingers oscillating with the type-case, a pair of notched segments normally free of said fingers, and devices for bringing the segments toward the fingers as the type-case swings.

55. In a typographic machine, the combination, substantially as set forth, with types, type-impressing mechanism, and a pad-carriage, of a rack and pinion to advance the carriage, a pawl and ratchet, a power-moved pawl-arm, a change-gear on the shaft of said ratchet, a change-gear on the shaft of said pinion, an adjustable sector-bracket, and intermediate gearing carried by said sector-bracket and gearing into said two change-gears.

56. In a typographic machine, the combination, substantially as set forth, with types, type-impressing mechanism, and a pad-carriage, of a rack and pinion to advance the carriage, a feed-pawl and ratchet to turn the pinion, a stop-pawl to prevent retreat of the ratchet, a stop to hold the feed-pawl normally disengaged, a limit-stop to be engaged by the advancing carriage, and connections from the limit-stop to the stop-pawl whereby the advancing carriage releases the ratchet from the stop-pawl.

57. In a typographic machine, the combination, substantially as set forth, with types, type-impressing mechanism, and a pad-carriage, of a rack and pinion to advance the carriage, a feed-pawl and ratchet to turn the pinion, a stop-pawl to prevent retreat of the ratchet, a stop to hold the feed-pawl normally disengaged, a limit-stop to be engaged by the advancing carriage, a limit-stop to be engaged by the retreating carriage, and connections from the limit-stops to the stop-pawl whereby the advancing carriage releases the ratchet from the stop-pawl and the retreating carriage restores the stop-pawl.

58. In a typographic machine, the combination, substantially as set forth, of a driving-shaft, a pulley loose thereon, a clutch for engaging the pulley with the shaft, a pad-carriage, carriage-feeding mechanism operated by said shaft, and carriage-backing mechanism operated by said pulley, whereby the carriage may feed forward only when the shaft is in motion, but may move back when the shaft is at rest.

59. In a typographic machine, the combination, substantially as set forth, with types, type-impressing mechanism, and a pad-carriage, of a carriage-feeding mechanism, a carriage-backing shaft, a slip-pulley thereon, a stop to prevent retreat of the carriage, and connections to said stop to be engaged by the advancing carriage to release the stop.

60. In a typographic machine, the combination, substantially as set forth, with types, type-impressing mechanism, and a pad-carriage, of a carriage-feeding mechanism, a carriage-backing shaft, a friction-disk thereon, a pulley-rim driving said disk by friction, a stop to prevent retreat of the carriage, and connections to said stop to be engaged by the advancing carriage to release the stop.

61. In a typographic machine, the combination, substantially as set forth, with types, type-impressing mechanism, and a pad-carriage, of a carriage-feeding mechanism, a carriage-backing shaft, a slip-pulley thereon, a driving-shaft, a stop-clutch, a belt from the stop-clutch to the slip-pulley, a stop to prevent retreat of the carriage, and connections to said stop to be engaged by the advancing carriage to release the stop.

62. In a typographic machine, the combination, substantially as set forth, with types, type-impressing mechanism, a pad-carriage, and feed devices to advance the carriage, of an intermittently-rotating driving-shaft, a continuously-rotating carriage-backing slip-pulley, a stop to prevent retreat of the carriage, and connections to said stop to be engaged by the advancing carriage to release the stop.

63. In a typographic machine, the combination, substantially as set forth, with types, type-impressing mechanism, and a pad-carriage, of a pinion to advance the carriage, a pinion to back the carriage, a driving-shaft arranged to operate the first pinion, and a slip-pulley to operate the backing-pinion.

64. In a typographic machine, the combination, substantially as set forth, with types, type-impressing mechanism, and a pad-carriage, of two limit-stops to be engaged by the carriage, a driving-shaft, a lock therefor, and connections from said limit-stops to said lock whereby the driving-shaft cannot operate while the carriage is retreating.

65. In a typographic machine, the combination, substantially as set forth, with a pad-holder, types arranged to be dealt with singly, type-impressing mechanism, and a finger-key for each type, of a constant-stroke feed part, as a rocking arm, moved by power at each impulse of the machine to provide for feeding the pad-holder, a variable-stroke feed part, as a lever, moving in accordance with the degree of pad feed, dogs for causing the motion of said constant-stroke part to be imparted to said variable-stroke part in degree according to the dog brought into action, and connections from the dogs to the appropriate finger-keys whereby a finger-key brings an appropriate dog into action.

66. In a typographic machine, the combination, substantially as set forth, with a pad-holder, types arranged to be dealt with singly, type-impressing mechanism, and a finger-key for each type, of a constant-stroke feed part, as a rocking arm, moved by power at each impulse of the machine to provide for feeding the pad-holder, a variable-stroke feed part, as a lever, moving in accordance with the degree of pad feed, dogs for causing the motion of said constant-stroke part to be imparted to said variable-stroke part in degree according to the dog brought into action, a connection between the constant-stroke part and variable-stroke part whereby a minimum of motion or unit of feed is imparted at each and every impulse of the machine, and connections from dogs to the type-keys pertinent to type calling for more than a unit of pad feed.

67. In a typographic machine, the combination, substantially as set forth, with a pad-holder, types arranged to be dealt with singly, type-impressing mechanism, and a finger-key for each type, of a driving-shaft, a feed-cam thereon, a constant-stroke feed part, as a rocking arm, operated by said cam, a variable-stroke feed part, as a lever, dogs for causing the motion of the constant-stroke part to be imparted to the variable-stroke part in degree according to the dog brought into action, and connections between the dogs and appropriate finger-keys.

68. In a typographic machine, the combination, substantially as set forth, with a pad-holder, types arranged to be dealt with singly, type-impressing mechanism, and a finger-key for each type, of a constant-stroke feed part, as a rocking arm, moved by power at each impulse of the machine to provide for feeding the pad-holder, a variable-stroke feed part, as a lever, moving in accordance with the degree of pad feed, dogs for causing the motion of said constant-stroke part to be imparted to said variable-stroke part in degree according to the dog brought into action, a tumbling-shaft connected with each dog, and connections from the tumbling-shafts to the appropriate finger-keys.

69. In a typographic machine, the combination, substantially as set forth, with a pad-holder, types arranged to be dealt with singly, type-impressing mechanism, and a finger-key for each type, of a constant-stroke feed part, as a rocking arm, moved by power at each impulse of the machine to provide for feeding the pad-holder, a variable-stroke feed part, as a lever, moving in accordance with the degree of pad feed dogs for causing the motion of said constant-stroke part to be imparted to said variable-stroke part in degree according to the dog brought into action, feed-levers engaged by the appropriate finger-keys, and connections from the levers to the dogs.

70. In a typographic machine, the combination, substantially as set forth, with a pad-holder, types arranged to be dealt with singly, type-impressing mechanism, and a finger-key for each type, of a constant-stroke feed part, as a rocking arm, moved by power at each impulse of the machine to provide for feeding the pad-holder, a variable-stroke feed part, as a lever, moving in accordance with the degree of pad feed, dogs for causing the motion of said constant-stroke part to be imparted to said variable-stroke part in degree according to the dog brought into action, feed-levers, each disposed alongside of and engaged by several finger-keys, and connections from the levers to the dogs.

71. In a typographic machine, the combination, substantially as set forth, with a pad-holder, types arranged to be dealt with singly, type-impressing mechanism, and a finger-key for each type, of a constant-stroke feed part, as a rocking arm, moved by power at each impulse of the machine to provide for feeding the pad-holder, a variable-stroke feed part, as a lever, moving in accordance with the degree of pad feed, dogs for causing the motion of said constant-stroke part to be imparted to said variable-stroke part in degree according to the dog brought into action, a tumbling-shaft for and connected with each dog, and feed-levers adjustable alongside said shafts and engaged by appropriate finger-keys.

72. In a typographic machine, the combination, substantially as set forth, with a pad-holder, types arranged to be dealt with singly, type-impressing mechanism, and a finger-key for each type, of a constant-stroke feed part, as a rocking arm, moved by power at each impulse of the machine to provide for feeding the pad-holder, a variable-stroke feed part, as a lever, moving in accordance with the degree of pad feed, dogs for causing the motion of said constant-stroke part to be imparted to said variable-stroke part in degree according to the dog brought into action, a driving-shaft, a cam thereon, and connnections between said cam and dogs whereby the rotation of the cam restores a displaced dog to normal idle position.

73. In a typographic machine, the combination, substantially as set forth, of a carriage-rail, a carriage sliding thereon, a pad-holder sliding in the carriage at right angles to the rail, a rack and pinion to move the pad-holder in the carriage, a pawl and ratchet to turn said pinion, a connection to transmit motion to said pawl, and a wiper on the rail to engage said connection and move the pawl forward as the carriage travels back on the rail.

74. In a typographic machine, the combination, substantially as set forth, of a carriage-rail, a carriage sliding thereon, a pad-holder sliding in the carriage at right angles to the rail, a rack and pinion to move the pad-holder in the carriage, a pawl and ratchet to turn said pinion, a connection to transmit motion to said pawl, and a wiper mounted on the rail and arranged to engage and move said connections and advance the pawl as the carriage travels back upon the rail and to be moved by said connection without pawl movement as the carriage travels forward on the rail.

75. In a typographic machine, the combination, substantially as set forth, of a carriage-rail, a carriage sliding thereon, a pad-holder sliding in the carriage at right angles to the rail, a rack and pinion to move the pad-holder in the carriage, a pawl and ratchet to turn said pinion, a rocking lever mounted on the carriage and connected to said pawl and having a projection, a wiper engaging and moving said projection as the carriage moves back upon the rail and serving to advance the pawl, a stop to limit the return motion of said projection, and devices for changing the position of said stop to regulate the vertical feed of the pad.

76. In a typographic machine, the combination, substantially as set forth, of a carriage-rail, a carriage sliding thereon, a pad-holder sliding in the carriage at right angles to the rail, a rack and pinion to move the pad-holder in the carriage, a pawl and ratchet to turn said pinion, a rocking lever mounted on the carriage and connected to said pawl and having a projection, a wiper engaging and moving said projection as the carriage moves back upon the rail and serving to advance the pawl, an adjusting-lever mounted on the axis of said rocking lever, a stop on said adjusting-lever to limit the return motion of said projection, and a series of detents for adjusting the position of said adjusting-lever.

77. In a typographic machine, the combination, substantially as set forth, of a carriage-rail, a carriage sliding thereon, a pad-holder sliding in the carriage at right angles to the rail, a rack and pinion to move the pad-holder in the carriage, a pawl and ratchet to turn said pinion, a rocking lever mounted on the carriage and connected to said pawl and having a projection, a wiper engaging and moving said projection as the carriage moves back upon the rail and serving to advance the pawl, and a stop to limit the return motion of said projection.

78. In a typographic machine, the combination, substantially as set forth, of a carriage-rail, a carriage sliding thereon, a pad-holder sliding in the carriage at right angles to the rail, a rack and pinion to move the pad-holder in the carriage, a pawl and ratchet to turn said pinion, a connection to transmit motion to said pawl, a wiper on the rail to engage said connection as the carriage moves back, a roof-piece over said pawl and clear thereof as the pawl works its ratchet, and devices to abnormally extend the back-stroke of the pawl and bring its heel into engagement with said roof to disengage the pawl from its ratchet.

79. In a typographic machine, the combination, substantially as set forth, of a carriage-rail, a carriage sliding thereon, a pad-holder sliding in the carriage at right angles to the rail, a rack and pinion to move the pad-holder in the carriage, a ratchet connected with said pinion, a feed-pawl therefor, a roof-piece to engage the feed-pawl heel and disengage the pawl when drawn abnormally backward, a stop-pawl engaging said ratchet, a connection to transmit motion to said feed-pawl and having a projection to engage said stop-pawl, a wiper on the rail to move said connection as the carriage goes back, and devices to move said connection abnormally backward to release both said pawls.

80. In a typographic machine, the combination, substantially as set forth, of a carriage-rail, a carriage sliding thereon, a pad-holder sliding in the carriage at right angles to the rail, a rack and pinion and pawl at each side of the pad-holder, a three-armed lever pivoted on the carriage, connections from said lever to the pawls, and a wiper to engage and rock said lever as the carriage moves back on the rail.

81. The combination, substantially as set forth, of a case having a wicket, a cylinder having a spiral groove and arranged to rotate and rise and fall in said case, a spindle for said cylinder, and a series of graduations on the cylinder parallel with said spiral groove.

82. The combination, substantially as set forth, of a frame having guide-holes for finger-keys, finger-keys having stems engaging said guide-holes, levers or blades disposed alongside the stems, and pins projecting from the stems over the levers or blades.

83. The combination, substantially as set forth, of a frame having guide-holes for finger-keys, finger-keys having bored and slotted stems engaging said guide-holes, springs within the stems, and abutment-strips having teeth projecting into the key-stems.

84. In a typographic machine, the combination, substantially as set forth, with a pad-holder, types, and mechanism for forcing the types singly toward the pad-holder, of a pressure-finger near the impression-point of the pad out of the path of types and standing normally free from the pad and means for pressing the pressure-finger to the pad at the time of impression.

85. In a typographic machine, the combination, substantially as set forth, with a pad-holder, types, and mechanism for forcing the types singly toward the pad-holder, of a pressure-finger near the impression-point of the pad out of the path of types and standing normally free from the pad, means for forcing the pressure-finger to the pad at the time of impression, and a yielding connection between the forcing means and pressure-finger whereby the finger is forced to the pad with an elastic pressure.

86. In a typographic machine, the combination, substantially as set forth, with a pad-holder, types, and mechanism for forcing a type toward the pad-holder, of a pressure-finger near the impression-point of the pad and standing normally free from the pad, means for forcing the pressure-finger to the pad at the time of impression, a spring connection between the forcing means and pressure-finger whereby the finger is forced to the pad with an elastic pressure, and adjusting devices for regulating the tension of said spring connection.

87. In a typographic machine, the combination, substantially as set forth, with a pad-holder, types, and mechanism for forcing a type toward the pad-holder, of a pressure-finger near the impression-point of the pad and standing normally free from the pad, a wedge engaging the pressure finger, and means for moving the wedge to force the finger to the pad at the time of impression.

88. In a typographic machine, the combination, substantially as set forth, with a pad-holder, types, and mechanism for forcing a type toward the pad-holder, of a pressure-finger near the impression-point of the pad and standing normally free from the pad, a wedge engaging the finger, a rocking arm, and connections between the wedge and the rocking arm.

89. In a typographic machine, the combination, substantially as set forth, with a pad-holder, types, and mechanism for forcing a type toward the pad-holder, of a pressure-finger near the impression-point of the pad and standing normally free from the pad, a wedge engaging the finger, a driving-shaft, a rocking arm, connections between the wedge and the rocking arm, and a cam on the driving-shaft adapted to move the wedge and force the finger to the pad at each rotation of the driving-shaft.

90. In a typographic machine, the combination, substantially as set forth, with a pad-holder, types, and mechanism for forcing the types singly toward the pad-holder, of a rigid plate disposed between the types and pad-holder, an eye in said plate for the passage of a type, a pressure-finger mounted on the plate near the eye, and means for forcing the finger to the pad at the time of impression.

91. The combination, substantially as set forth, of a pad-holder having a fixed pad-gripping rib, a pad-clamp arranged to move on the holder to and from said rib, and a cam to lock the clamp in adjusted position.

92. In a typographic machine, the combination, substantially as set forth, with a pad-holder and a movable case of endwise-movable types, of a hook-ended plunger adapted to engage any type brought to the plunger-line, an anvil rigidly supported in the plunger-line and adjustable to and from the plunger independent of the position of the pad-holder, a driving-shaft, and means for causing rotation of said shaft to force the plunger a definite distance toward said anvil.

93. In a typographic machine, the combination, substantially as set forth, with a pad-holder and a movable case of endwise-movable type, of a plunger adapted to engage any type brought to the plunger-line, a fixed anvil engaging the back of the pad in that line, a toggle connected with the plunger, and a driving-shaft for operating the toggle to advance the plunger and engaged type a definite distance toward the anvil.

94. In a typographic machine, the combination, substantially as set forth, with a pad-holder and a movable case of endwise-movable type, of a fixed anvil engaging the rear of the pad, a plunger adapted to engage any type brought to the plunger-line and force the type a definite distance toward the anvil, a driving-shaft, a cam on the driving-shaft, and connections from the cam to the plunger to produce one advance and retreat of the plunger at each rotation of the shaft.

95. The combination, substantially as set forth, of a shaft, a toothed pulley loose thereon, a fixed rim having a notch, a driver secured to the shaft and arranged to engage the pulley and be held in such engagement by said rim and to disengage at said notch, and a movable piece at said notch to push the driver out of the notch and into engagement with said pulley.

96. The combination, substantially as set forth, of a shaft, a toothed pulley loose thereon, a fixed rim having a notch with an arresting-wall, a driver on the shaft arranged to engage said pulley and be held in such engagement by said rim and to disengage at said notch and rest against said wall, and a movable piece at said notch to push the driver out of the notch and into engagement with the pulley.

97. The combination, substantially as set forth, of a shaft, a toothed pulley loose thereon, a fixed rim having a notch, a driver on the shaft arranged to engage said pulley and be held in such engagement by said rim and to disengage at the notch, a fixed incline at the notch to move the driver from the pulley to the notch, and a movable piece to move the driver from the notch to the pulley.

98. The combination, substantially as set forth, of a shaft, a toothed pulley loose thereon, a fixed rim having a notch with an arresting-wall, a driver on the shaft arranged to engage the pulley and be so held by the rim and to disengage and rest at the notch-wall, a fixed incline to move the driver from the pulley to the notch, and a movable piece to move the driver from the notch to the pulley.

99. The combination, substantially as set forth, of a shaft, a toothed pulley loose thereon, a fixed rim having a notch with an arresting-wall, a driver on the shaft arranged to engage said pulley and be so held by the rim and to disengage and rest at the notch-wall, a latch to prevent the rebound of the driver from the wall, and a movable piece to move the driver from the notch into engagement with the pulley.

100. The combination, substantially as set forth, of a shaft, a toothed pulley loose thereon, a fixed notched rim, a driver on the shaft arranged to engage the pulley and be so held by the rim and released at the notch, and a sliding pin at the notch to push the driver from the notch.

101. The combination, substantially as set forth, of a shaft, a toothed pulley loose thereon, a fixed notched rim, a driver on the shaft arranged to engage the pulley and be so held by the rim and released at the notch, a sliding pin at the notch to push the driver from the notch, and a cam on the shaft to withdraw the pin.

THOMAS T. HEATH.
ALOIS N. VERDIN.

Witnesses:
J. W. SEE,
P. P. SHEEHAN.